United States Patent [19]

Allran et al.

[11] Patent Number: 5,625,845
[45] Date of Patent: Apr. 29, 1997

[54] SYSTEM FOR FACILITATING CONTINUOUS, REAL-TIME, UNIDIRECTIONAL, AND ASYNCHRONOUS INTERTASK AND END-DEVICE COMMUNICATION IN A MULTIMEDIA DATA PROCESSING SYSTEM USING OPEN ARCHITECTURE DATA COMMUNICATION MODULES

[75] Inventors: Gary G. Allran, Boca Raton, Fla.; Donald E. Carmon, Durham, N.C.; Fetchi Chen, Boca Raton; Jose A. Eduartez, Miami Beach, both of Fla.; Charles R. Knox, Raleigh, N.C.; William W. Lawton, Boca Raton, Fla.; Llewellyn B. Marshall, Cary, N.C.; Nathan A. Mitchell; Malcolm S. Ware, both of Raleigh, N.C.; Raymond W. Weeks, Apex, N.C.; Yoav Medan, Haifa; Uzi Shvadron, Misgav, both of Israel

[73] Assignee: International Business Machines Corporation, Armonk, N.Y.

[21] Appl. No.: 960,976

[22] Filed: Oct. 13, 1992

[51] Int. Cl.$^6$ ............................ G06F 13/14; G06F 13/20
[52] U.S. Cl. ........................ 395/856; 395/857; 395/800; 395/287; 395/685
[58] Field of Search ................................... 395/275, 325, 395/425, 650, 856, 857, 800, 287, 700, 154

[56] References Cited

U.S. PATENT DOCUMENTS

| | | | |
|---|---|---|---|
| 3,496,551 | 2/1970 | Driscoll et al. | 340/172.5 |
| 4,152,761 | 5/1979 | Louie | 364/200 |
| 4,177,513 | 12/1979 | Hoffman et al. | 364/200 |
| 4,286,322 | 8/1981 | Hoffman et al. | 364/200 |
| 4,333,144 | 6/1982 | Whiteside et al. | 364/200 |
| 4,692,861 | 9/1987 | May | 364/200 |

(List continued on next page.)

OTHER PUBLICATIONS

IBM Technical Disc. Bulletin vol. 13 No. 10, Mar. 1971, W.H. Harrison "Intertask Communication Facilities".
IBM Technical Disc. Bulletin vol. 24 No. 5 Oct. 1981, T.W. Beglin "Multitasking Volume Backup In A Space Management Program".
IBM Technical Disc. Bulletin vol. 32 No. 11, Apr. 1990, "Structuring Data For Transfer And Sharing In A Distributed Environment".

Primary Examiner—Thomas C. Lee
Assistant Examiner—Rehana P. Krick
Attorney, Agent, or Firm—Bernard D. Bogdon; Felsman, et al. & Dillon

[57] ABSTRACT

A data processing system is provided for executing multimedia applications which interface with multimedia end devices that consume or produce at least one of (a) real-time and (b) asynchronous streamed data. The data processing system includes a central processing unit for data processing operations including execution of the multimedia application, a digital signal processor for processing data including the streamed data, and a plurality of modular components which cooperate to provide a substantially open architecture. The plurality of modular components include a plurality of modular multimedia software tasks which are executable by the digital signal processor and which may be called by the multimedia application for execution in the digital signal processor, as well as a plurality of data communication modules for linking selected ones of the plurality of modular multimedia software tasks with selected others of the plurality of modular multimedia software tasks, and for linking selected multimedia end devices with selected ones of the plurality of modular multimedia software tasks. Each of the plurality of data communication modules allows continuous, real-time and unidirectional communication of streamed data. The enhanced connectivity of the modular approach for the multimedia data processing system allows additional modular multimedia software tasks to be added to the plurality of modular multimedia software tasks and selectively linked to selected ones of the plurality of modular multimedia software tasks and selected ones of the multimedia end devices.

34 Claims, 25 Drawing Sheets

U.S. PATENT DOCUMENTS

| | | | |
|---|---|---|---|
| 4,835,685 | 5/1989 | Kun | 364/200 |
| 4,847,751 | 7/1989 | Nakade et al. | 364/200 |
| 4,862,452 | 8/1989 | Milton et al. | 370/62 |
| 4,955,054 | 9/1990 | Boyd, Jr. et al. | 379/269 |
| 4,980,824 | 12/1990 | Tulpule et al. | 364/200 |
| 4,991,169 | 2/1991 | Davis et al. | 370/77 |
| 5,245,322 | 9/1993 | Dinwiddie, Jr. et al. | 345/115 |
| 5,261,072 | 11/1993 | Siegel | 395/425 |
| 5,291,614 | 3/1994 | Baker et al. | 395/800 |
| 5,297,285 | 3/1994 | Abrahamsson et al. | 395/700 |
| 5,339,430 | 8/1994 | Lundin et al. | 395/700 |
| 5,347,637 | 9/1994 | Halford | 395/325 |
| 5,381,547 | 1/1995 | Flug et al. | 395/700 |

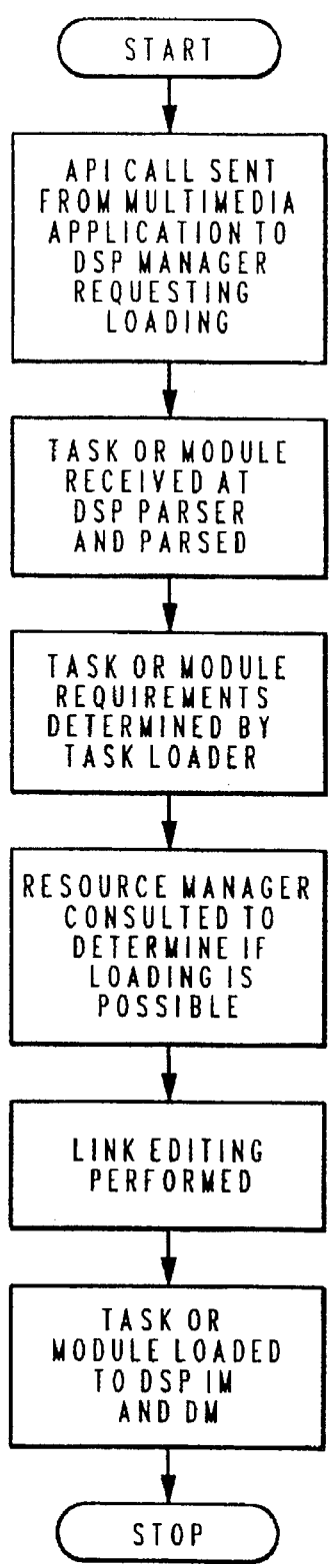
Fig. 31
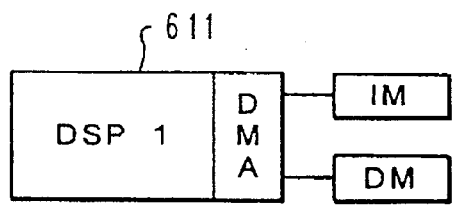
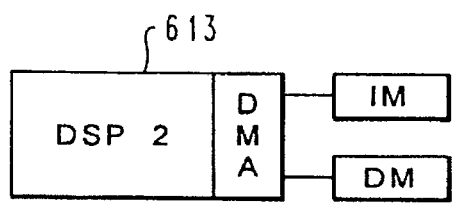
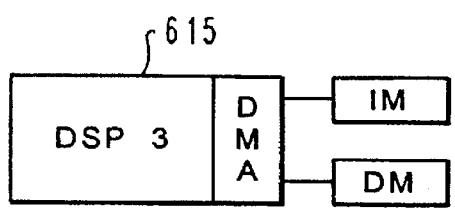
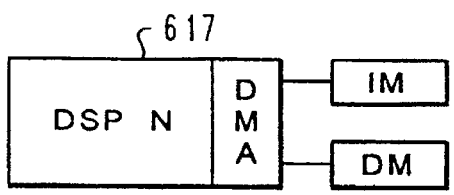
Fig. 32

SYSTEM FOR FACILITATING CONTINUOUS, REAL-TIME, UNIDIRECTIONAL, AND ASYNCHRONOUS INTERTASK AND END-DEVICE COMMUNICATION IN A MULTIMEDIA DATA PROCESSING SYSTEM USING OPEN ARCHITECTURE DATA COMMUNICATION MODULES

BACKGROUND OF THE INVENTION

1. Technical Field

The present invention relates generally to techniques for sharing data streams, control signals, and variables between software tasks and multimedia end devices, and in particular to techniques for sharing data streams, control signals, and variables in a digital signal processor which interfaces with a data processing system.

2. Description of the Related Art

Multimedia application programs are becoming increasingly important in modern computing. Many experts believe that the coordinated operation of multimedia end devices, such as telephones, televisions, audio CD players, and CD ROMs, represents a substantial new market for data processing industries. In fact, some believe that many households remain without personal computing equipment due to the fact that heretofore data processing systems have failed to adequately control the coordinated and real-time operation of multimedia end devices. One continuing problem with the prior art multimedia data processing systems is that the multimedia application software remains in a closed architecture which is not suitable for interfacing with multimedia applications written by end users. Another considerable problem with prior art multimedia data processing systems is that the multimedia end devices are fairly intolerant of data loss or slippage which introduces undesirable data gaps and undesirable phase delays. Obtaining the coordinated and synchronized operation of a plurality of multimedia end devices has remained a goal which has been heretofore outside of the reach of prior art multimedia data processing systems. Experts agree that a true coordinated and synchronized operation of multimedia end devices would render multimedia data processing systems powerful teaching tools which could coordinate the display of text, still images, video images, audio output, and provide a true interactive education forum. Unfortunately, commercially available multimedia data processing systems have fallen short of expectations due principally to the rigidity of their architecture, the difficulty of passing real-time and/or asynchronous data streams between tasks, and difficulty of synchronizing the operation of multimedia end devices.

SUMMARY OF THE INVENTION

It is one objective of the present invention to provide an improved data processing system which is capable of executing multimedia applications which interface with multimedia end devices that consume or produce at least one of real-time and asynchronous streamed data, which has a substantially open architecture which allows for the addition of user-generated multimedia tasks to an array of prepackaged multimedia tasks.

It is another objective of the present invention to provide a data processing system for executing multimedia applications which includes a plurality of modular multimedia software tasks which are executable by a digital signal processor and which may be called by the multimedia application for execution in the digital signal processor in a substantially modular format, and which passes streamed data between modular multimedia software tasks and/or multimedia end devices through use of a plurality of modular data communication modules which may be selectively connected between selected modular multimedia software tasks and/or selected multimedia end devices.

It is yet another objective of the present invention to provide a plurality of modular data communication modules for communication of real-time and/or asynchronous streamed data between modular multimedia software tasks and/or multimedia end devices which are selectively connected between selected ones of the plurality of modular multimedia software tasks and/or multimedia end devices, which allow continuous, real-time, and unidirectional communication of streamed data.

These and other objectives are achieved as is now described. A data processing system is provided for executing multimedia applications which interface with multimedia end devices that consume or produce at least one of (a) real-time and (b) asynchronous streamed data. The data processing system includes a central processing unit for data processing operations including execution of the multimedia application, a digital signal processor for processing data including the streamed data, and a plurality of modular components which cooperate to provide a substantially open architecture. The plurality of modular components include a plurality of modular multimedia software tasks which are executable by the digital signal processor and which may be called by the multimedia application for execution in the digital signal processor, as well as a plurality of data communication modules for linking selected ones of the plurality of modular multimedia software tasks with selected others of the plurality of modular multimedia software tasks, and for linking selected multimedia end devices with selected ones of the plurality of modular multimedia software tasks. Each of the plurality of data communication modules allows continuous, real-time and unidirectional communication of streamed data. The enhanced connectivity of the modular approach for the multimedia data processing system allows additional modular multimedia software tasks to be added to the plurality of modular multimedia software tasks and selectively linked to at selected ones of the plurality of modular multimedia software tasks and selected ones of the multimedia end devices.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 31 is a flowchart representation of the process of determining whether a modular multimedia software task may be loaded to a dsp for execution;

FIG. 32 represents in block diagram format the "networking" of a plurality of dsps to perform modular multimedia software tasks.

DETAILED DESCRIPTION OF PREFERRED EMBODIMENT

Figure 1:
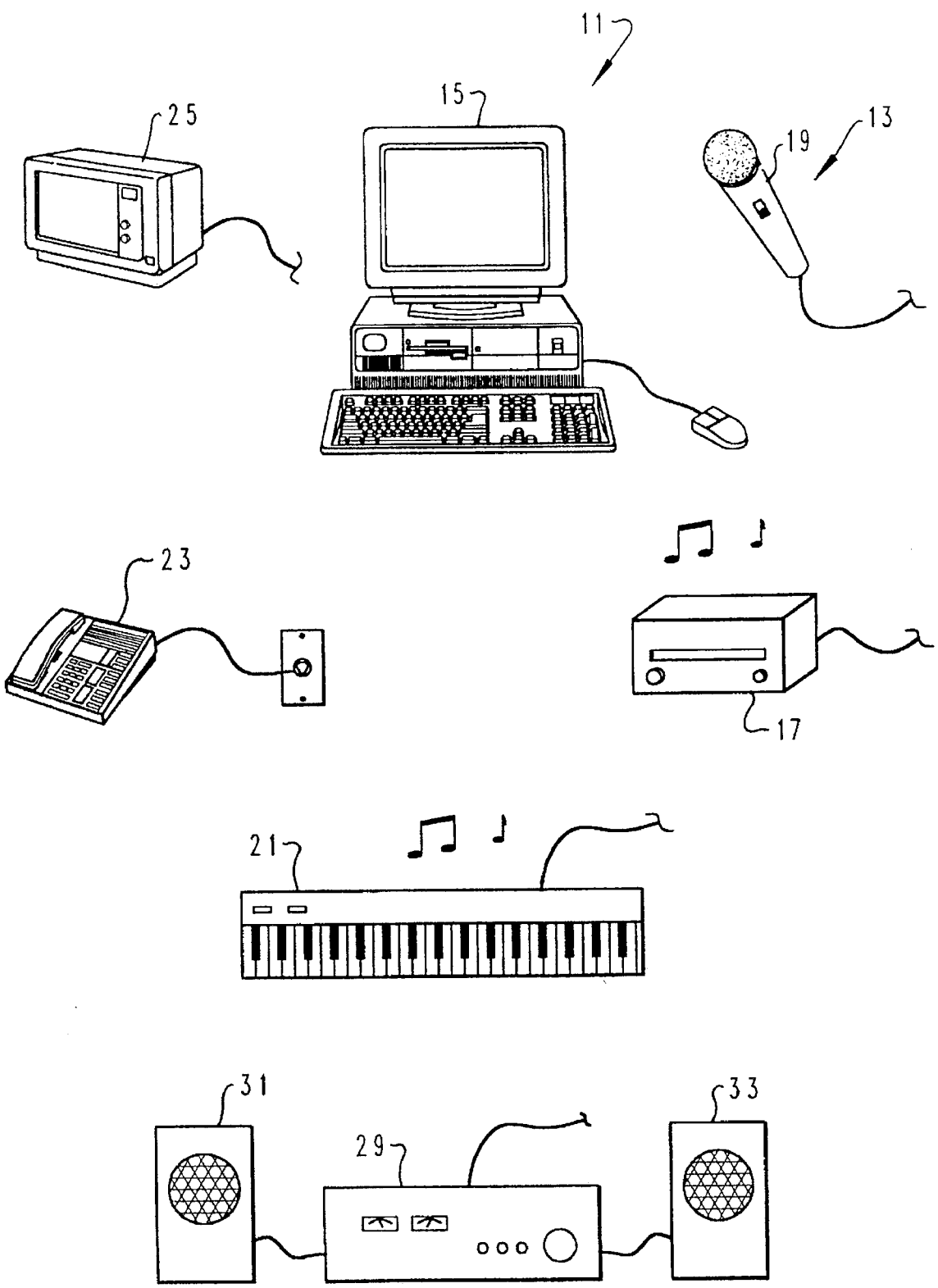
FIG. 1 is a pictorial representation of a multi-media data processing system which is connected to a plurality of multimedia end devices and is especially suited for processing multimedia applications.

With reference now to the figures and in particular with reference to FIG. 1, there is depicted multimedia data processing system 11 which includes a plurality of multimedia end devices 13 which are electrically connected to computer 15. Those skilled in the art, will, upon reference to the specification, appreciate that computer 15 may comprise any personal computer system well known in the prior art, such as the PS/2 IBM Computer manufactured by International Business Machines Corporation of Armonk, N.Y. The plurality of multimedia end devices 13 include all types of multimedia end devices which either produce or consume real-time and/or asynchronous streamed data, and include without limitation such end devices as CD-ROM player 17, microphone 19, keyboard 21, telephone 23, and video monitor 25. Each of these multimedia end devices 13 may be called by multimedia application software to produce or consume the streamed data.

For example, the operation of CD-ROM player 17 may be controlled by multimedia application software which is resident in, and executed by, computer 15. The real-time digital data stream generated as an output of CD-ROM player 17 may be received and processed by computer 15 in accordance with instructions of the multimedia application resident therein. For example, the real-time digital data stream may be compressed for storage on a conventional computer floppy disk or for transmission via modem over ordinary telephone lines for receipt by a remotely located computer system which may decompress and play the digital streamed data on analog audio equipment. Alternatively, the real-time data stream output from CD-ROM player 17 may be received by computer 15, and subjected to digital or analog filtering, amplification, and sound balancing before being directed, in analog signal form, to analog stereo amplifier 29 for output on audio speakers 29, 31.

Microphone 19 may be used to receive analog input signals corresponding to ambient sounds. The real-time analog data stream may be directed to computer 15, converted into digital form, and subjected to manipulation by the multimedia application software. The digital data may be stored, compressed, encrypted, filtered, subjected to transforms, output in analog form to analog stereo amplifier 27, directed as an output in analog form to telephone 23, digitized analog form as an output of a modem for transmission on telephone lines, transformed into visual images for display on video monitor 25, or subjected to a variety of other different and conventional multimedia digital signal processing operations.

In a similar fashion, the analog and digital inputs and outputs of keyboard 21, telephone 23, and video monitor 25 may be subjected to conventional multimedia operations in computer 15.

The present invention provides a number of significant advantages over existing multimedia data processing systems. The preferred embodiment of the present invention provides a multimedia data processing system which:

(1) provides an open architecture which allows for a myriad of user-written multimedia applications;

(2) allows for the coordinated and/or simultaneous operation of multimedia end devices without interfering in the real-time operation of the end devices;

(3) allows for the real-time and asynchronous communication of streamed data between modular multimedia software tasks;

(4) allows for the real-time and/or asynchronous communication of streamed data between the computer and multimedia end devices;

(5) allows for conventional functions of multimedia hardware end devices to be virtualized and performed in software;

(6) provides a modularity in design which facilitates the creation and operation of multimedia application software; and (7) allows for the dynamic reconfiguration of multimedia tasks without interruption of other on-going multimedia tasks, this allowing temporally overlapping operation of multimedia end devices.

Figure 2:
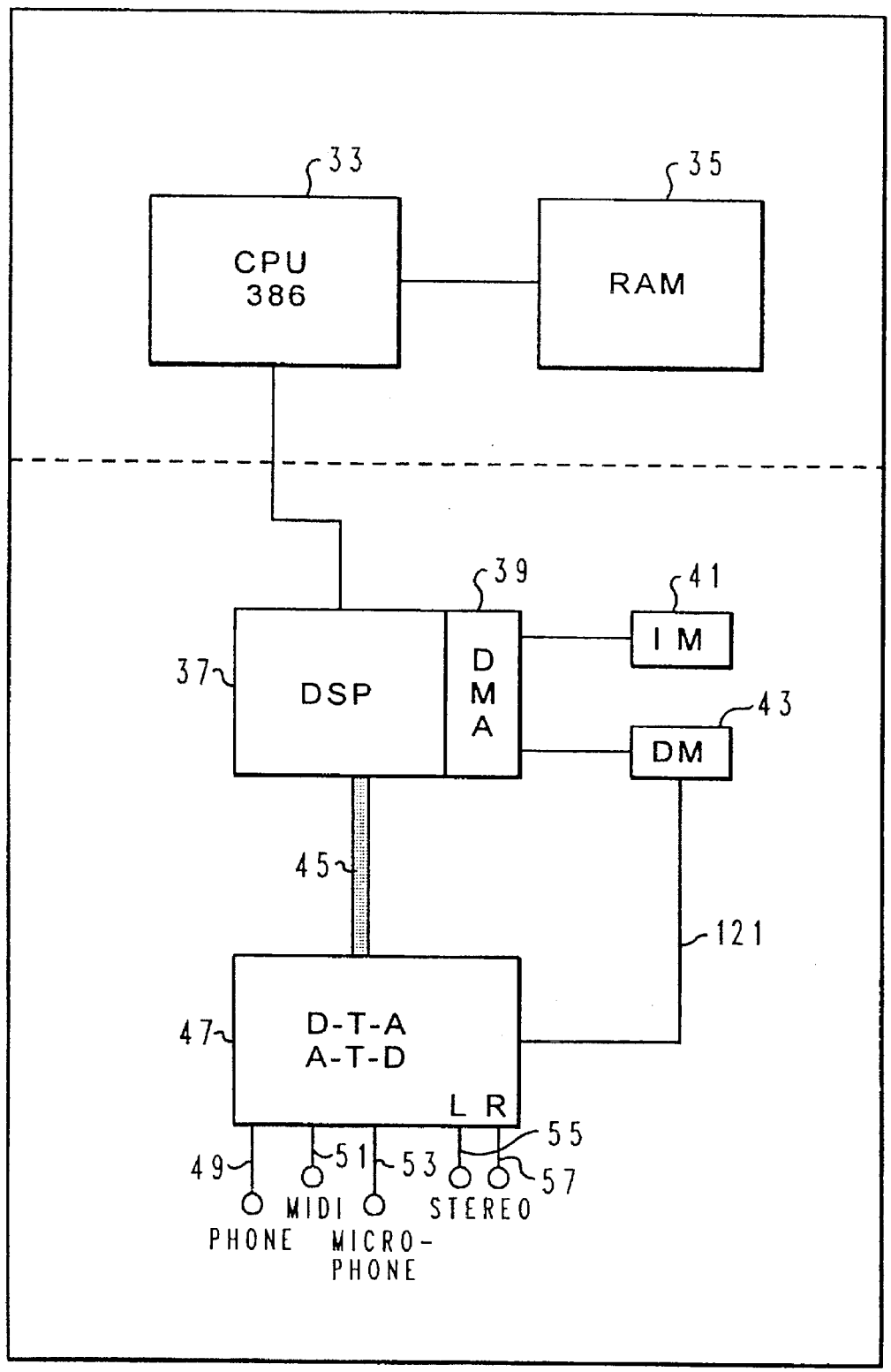
FIG. 2 is a block diagram representation of the principal hardware components which are utilized to execute multimedia applications which control the operation of the multimedia end devices.

FIG. 2 is a block diagram representation of the principal hardware components which are utilized, in the present invention, to execute multimedia applications which control the operation of multimedia end devices 13. As is conventional in multimedia data processing operations, central processing unit 33 is provided in computer 15. Typically, the multimedia application software is resident in RAM computer memory 35. CPU 33 executes the instructions which comprise the multimedia application. Also, as is typical in multimedia data processing operations, digital signal processor 37 is provided as an auxiliary processor which is dedicated to performing operations on the real-time and/or asynchronous streamed data. As is well known to those skilled in the art, digital signal processors are microprocessor devices which are dedicated for performing operations based upon, or which include, real-time data and are thus designed to be very fast to avoid interfering with the real-time nature of the multi-media end devices. Typically, in order to speed-up the operation of the digital signal processor 37, a conventional direct memory access 39 is provided to allow for the rapid fetching and storing of instructions and data. In the present invention, separate instruction memory 41 and data member 43 are provided to further speed up the operation of digital signal processor 37. Bus 45 is provided to communicate data between digital signal processor 37 and the digital-to-analog and analog-to-digital converter 47. Inputs and outputs for the various multimedia end devices 13 are connected through the digital-to-analog and analog-to-digital converter 47. In FIG. 2, a telephone input/output 49, MIDI input/output 51, microphone input 53, and stereo outputs 55, 57 are depicted as connected through the digital-to-analog and analog-to-digital converter 47 to digital signal processor 37.

Figure 3:
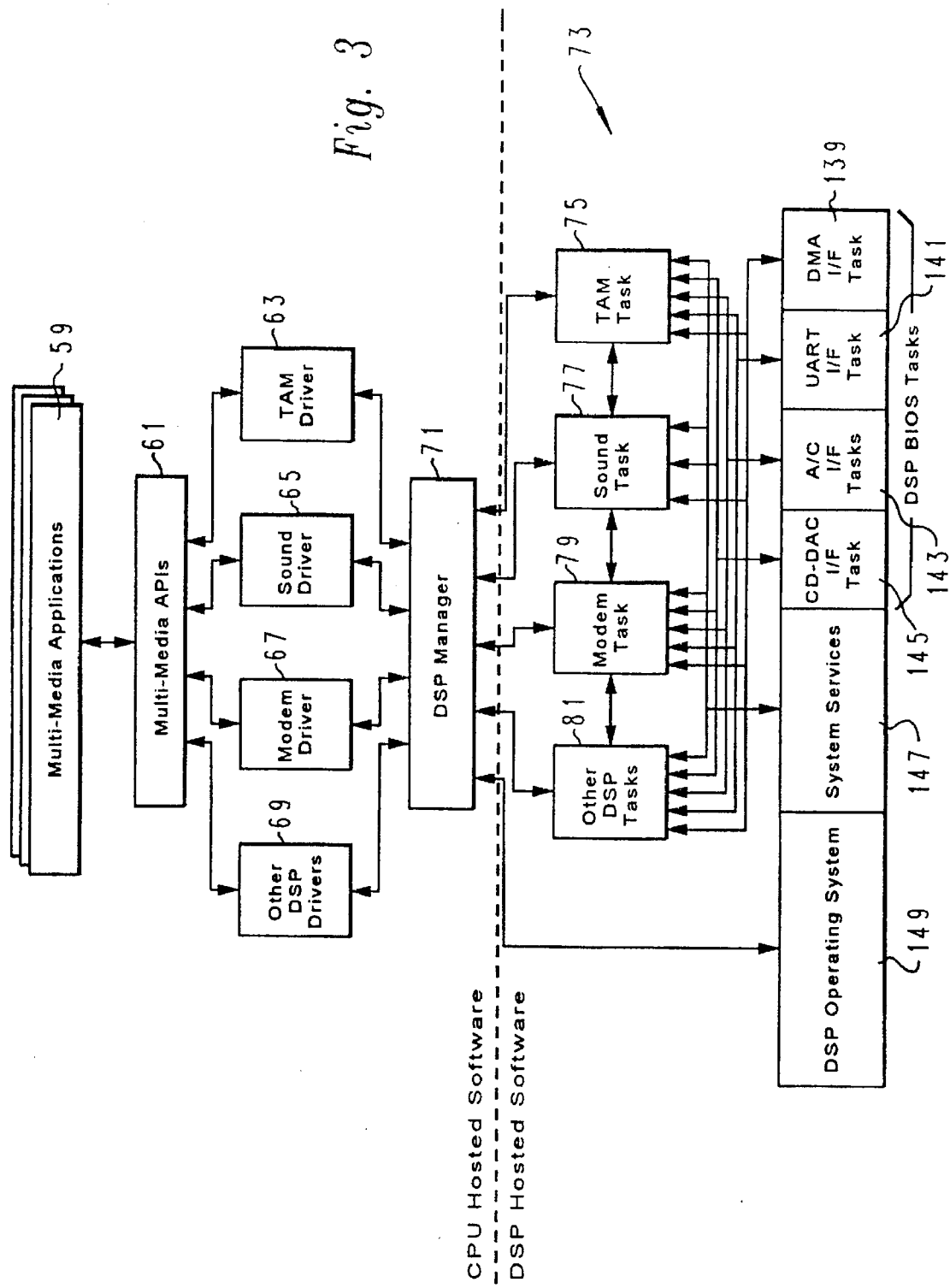
FIG. 3 is a block diagram representation of the principal software components of multimedia digital signal processing operations.

FIG. 3 is a block diagram representation of the principal software components of multimedia digital signal processing operations. The upper portion of this figure is representative of software which is hosted in central processing unit 33 (of FIG. 2) while the lower portion of this figure is representative of software hosted in digital signal processor 37 (of FIG. 2). As is shown, multimedia applications 59 communicate through multimedia application programming interfaces (APIs) to device drivers, such as telephone answering machine driver 63, sound driver 65, modem driver 67, and other digital signal processing driver 69 to digital signal processing manager 71. Digital signal processing manager 71 may call for and load for execution any one of a plurality of modular multimedia software tasks into digital signal processor 37 of (FIG. 2). Several representative modular tasks are depicted in FIG. 3, including telephone answering machine task (TAM) 75, sound task 77, and modem task 79. Other various digital signal processing tasks are graphically represented by block 81, which is labeled "other DSP tasks". These multimedia software tasks represent substantially irreducible operations which are performed on the real-time and/or asynchronous streamed data which is consumed or produced by multimedia end devices or other modular multimedia software tasks. The multimedia software tasks represent a set of instructions which are executable by the digital signal processor as well as a set of datapoints which represent real-time and/or asynchronous datapoints which have been produced by other modular multimedia software tasks or multimedia end devices, or will be consumed by other modular multimedia tasks or multimedia end devices. Frequently, multimedia application 59 will call for the performance of an operation which is represented by a plurality of multimedia modular software tasks. In this event, the tasks are arranged in a module, which is graphically depicted in FIG. 4.

Figure 4:
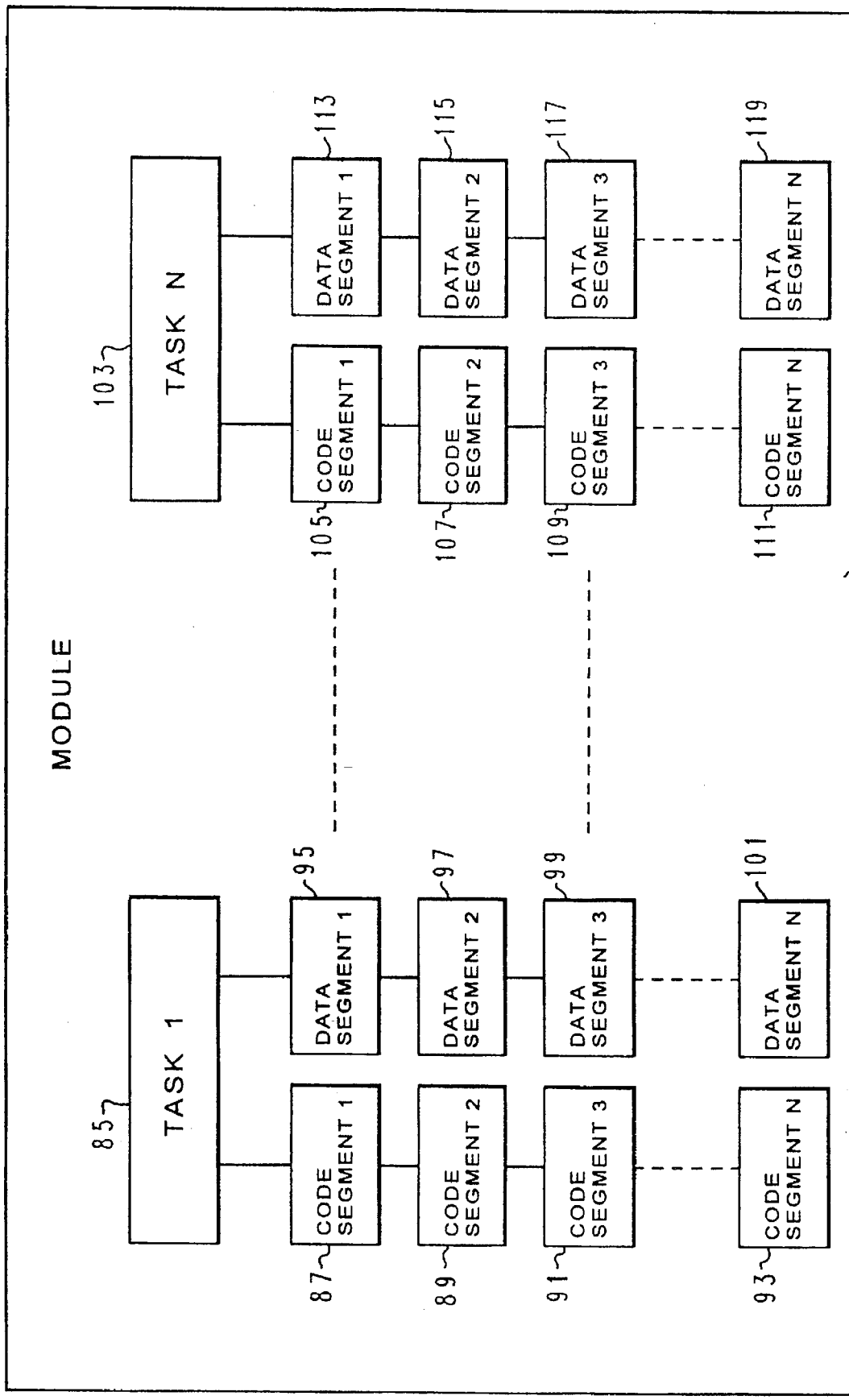
FIG. 4 is a block diagram representation of a multimedia operation which is comprised of a module which represents a grouping of N modular multimedia software tasks.

FIG. 4 is a block diagram representation of a multimedia operation which is comprised of module 83 which represents a grouping of N modular multimedia software tasks 85, 103. As is shown, task 1 is composed of a plurality of code segments 87, 89, 91, 93 and a plurality of data segments 95, 97, 99, and 101. Task 103 is likewise composed of a plurality of code segments 105, 107, 109, 111, and a plurality of data segments 113, 115, 117, 119. With reference again to FIG. 2, the code segments of tasks 85, 103 are resident in instruction memory 41, while the data segments of tasks 85, 103 are resident in data memory 43. As is visually represented in FIG. 2, real-time and/or asynchronous data which is either produced or consumed by the multimedia end devices 13 may be directly written to or read from data memory 43 via bus 121.

Figure 5:
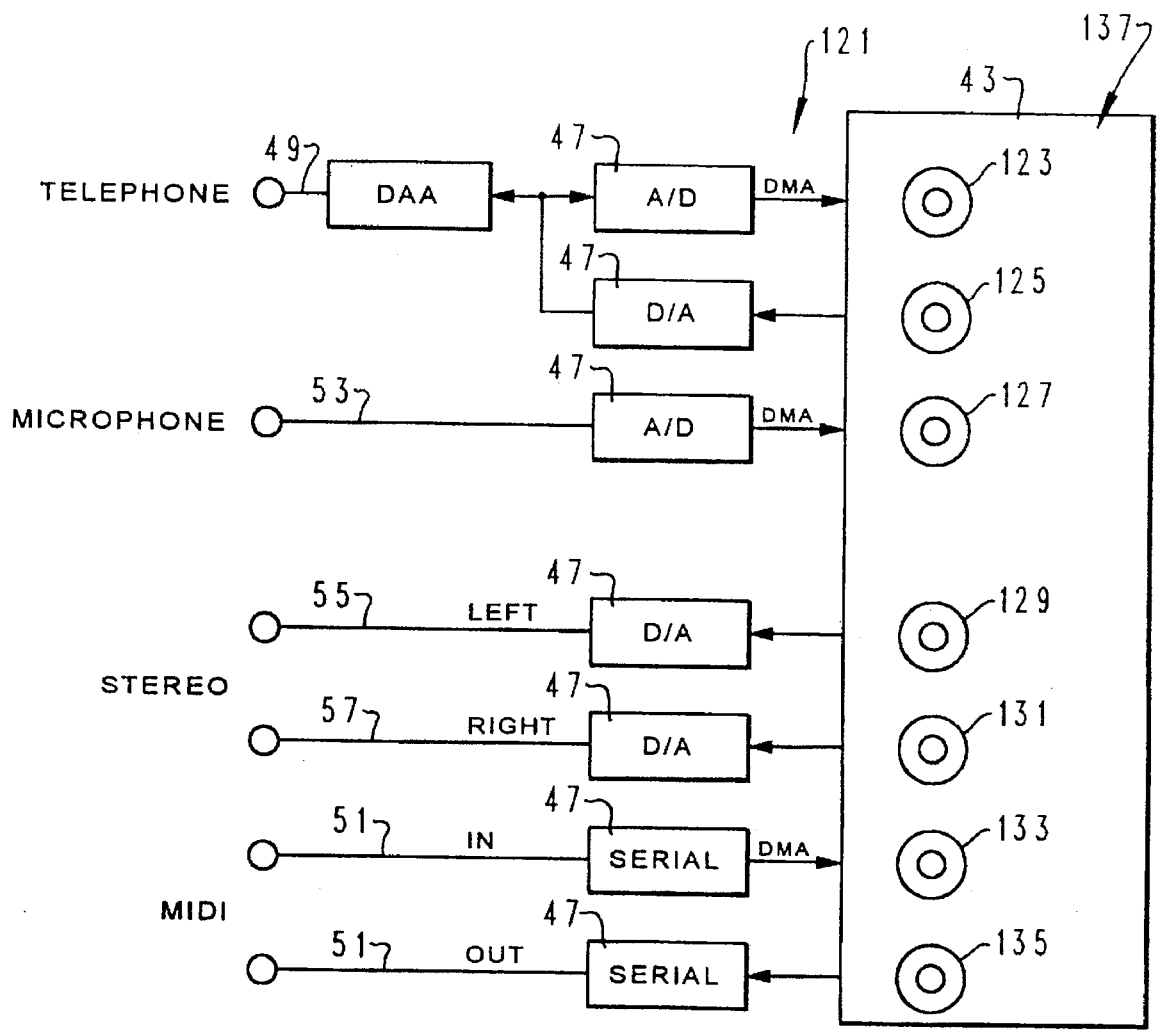
FIG. 5 is a block diagram representation of the direct reading and writing of real-time and/or asynchronous streamed data between multimedia end devices and dedicated data memory.

This feature is depicted in greater detail in FIG. 5, which is a block diagram representation of the direct reading and writing of real-time and/or asynchronous streamed data between multimedia end devices 11 and dedicated data memory 43. As is shown, telephone input/output 49, microphone input 53, MIDI terminal input/output 51, and left channel 55 and right channel 57 of a stereo output communicate through various analog-to-digital and digital-to-analog converters in converter 47 (of FIG. 2) and bus 21 to data memory 43. A plurality of data communication modules 137 are provided in data memory 43 for passing real-time and/or asynchronous steamed data between digital signal processor 37 and the multimedia end devices 13. Preferably, each data communication modules comprises a circular memory buffers, which will be described in greater detail herebelow, and include telephone input circular buffer 123, telephone output circular buffer 125, microphone input circular buffer 127, left channel stereo output circular buffer 129, right channel stereo output circular buffer 131, MIDI input circular buffer 133, and MIDI output circular buffer 135. As is depicted in FIG. 5, streamed data from telephone input 49, microphone input 53, and MIDI input 51 are directed to data memory 43 through use of a conventional direct memory access (DMA) operation.

With reference again to FIG. 3, a plurality of modular multimedia software tasks are resident in the digital signal processing BIOS, including: direct memory access interface task 139; universal asynchronous receiver and transmitter interface task 141; analog conversion interface task 143; and CD digital-to-analog conversion interface task 145. The multimedia modular software tasks, such as telephone answering machine task 75, sound task 77, modem task 79, and other digital signal processing tasks 81 communicate real-time and/or asynchronous streamed data between one another and with the digital signal processing BIOS tasks through use of data communication modules, such as those which are provided for writing and reading real-time and/or asynchronous stream data between data memory 43 and the plurality of multimedia end devices 13.

An open and modular architecture for multimedia operations is obtained in the present invention through use of this novel data communication module, when used in combination with an intertask control block, both of which will be described herebelow with reference to FIGS. 6 through 12. FIGS. 6c, 6b, and 6c are block diagram representations of the use of data communication modules and intertask control blocks to obtain a modular and open architecture. As is graphically shown in FIG. 6a, data communication module 155 may be employed to provide for continuous, real-time, and unidirectional transfer of data from task 151 to task 153, both of which are resident in a single digital signal processor. Intertask control block 157 is defined in task 151, while intertask control block 159 is defined in task 153. The intertask control blocks 157, 159 are provided to pass status and control information between tasks 151, 153.

FIG. 6b depicts the insertion of encryption task 161 between task 151 and task 153. As is shown, data communication module 155 passes data from task 151 to encryption task 163. Data communication module 163 is provided between encryption task 161 and task 153 to allow for the continuous, real-time and, unidirectional transmission of data from encryption task 161 to task 153. As is shown, intertask control blocks 157, 159 still serve to pass status and control information between tasks 151, 153. Tasks 151, 153 and encryption task 161 are all resident in a single digital signal processor.

FIG. 6c depicts a configuration with tasks 151, 161 resident in a first digital signal processor, and with task 153 resident in a second digital signal processor, which are cooperating to perform multimedia tasks. As is shown, data communication module 155 is provided for passing data between task 151 and task 161. Data communication module 163 is provided for passing data from task 161 to task 153. An additional intertask control block 165 is provided for passing status and control information between tasks 151, 161, while intertask control blocks 157, 159 pass status and control variables between task 151, 153.

Figure 6A:
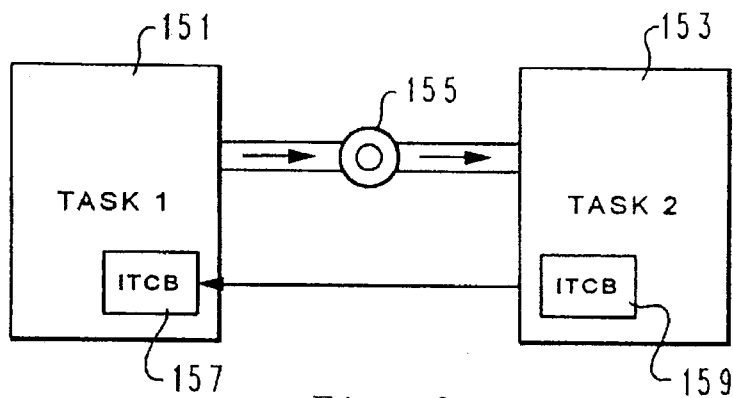
FIGS. 6a, 6b, and 6c are block diagram representations of the use of data communication modules and intertask control blocks to obtain a modular and open architecture.
Figure 6B:
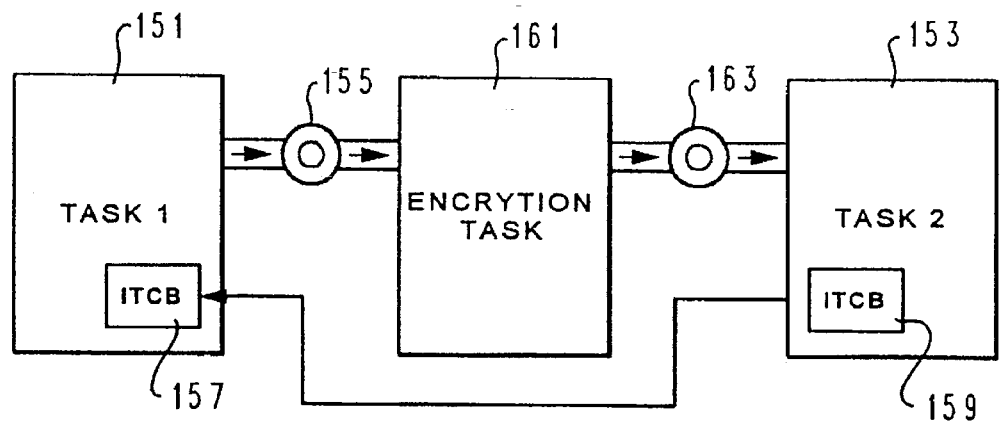
Figure 6C:
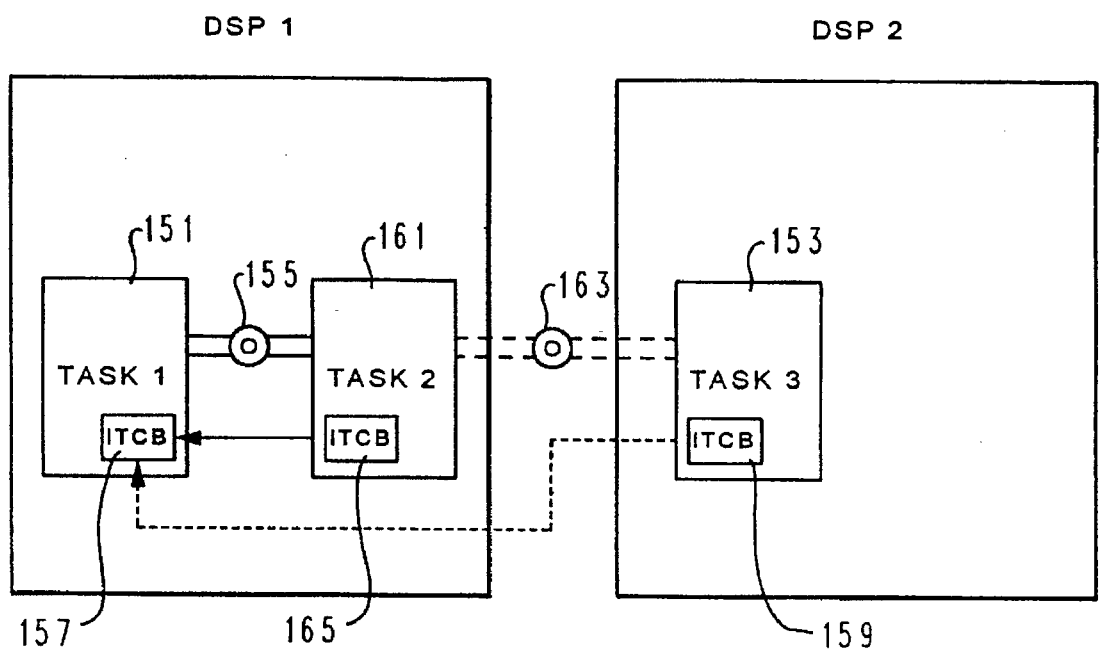

In the manner shown in FIGS. 6a, 6b, and 6c, modular multimedia software tasks and multimedia end devices may be connected together in a myriad of user-selected combinations. Users may code unique tasks for individual needs, and then connect these tasks to preexisting modular multimedia software tasks by using data communication modules and intertask control blocks. Users need not be concerned with the particular coding of the modular multimedia software tasks, and need only be concerned with the data communication protocols for passing data through data communication modules and intertask control blocks. This provides a relatively low-risk open architecture which allows users to code their own multimedia application software without undue risk to the operation of prepackaged modular multimedia software tasks. The use of the data communication modules and intertask communication blocks provides a greatly enhanced connectivity and represents a substantially open architecture, thus allowing a large number of software vendors to create and market prepackaged multimedia application software which include a large variety of modular multimedia software tasks which are executable by the digital signal processor without interference with other prepackaged multimedia application software which has been generated by other software vendors, as well as the end users themselves. In order to sustain this substantially open architecture, a number of strict rules must be developed with regard to the data communication modules and intertask control blocks.

Figure 7A:
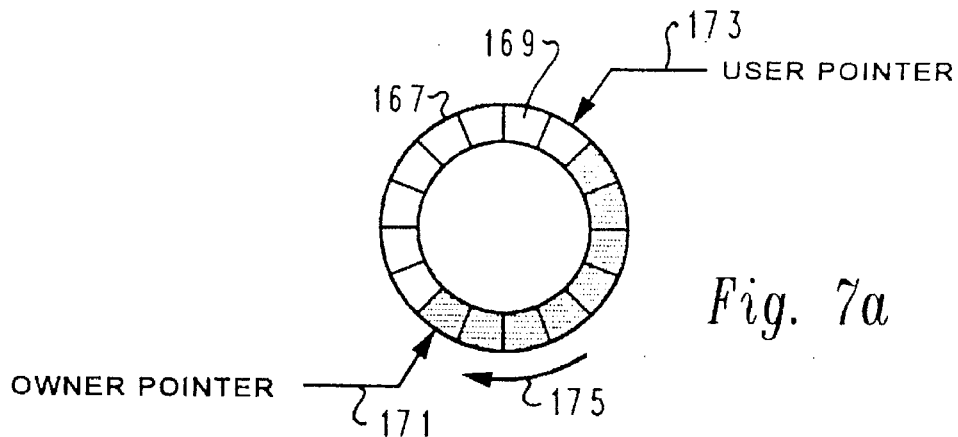
FIGS. 7a, 7b, and 7c depict the preferred operating rules which allow orderly use of data communication modules to transfer data between modular multimedia software tasks and multimedia end devices.
Figure 7B:
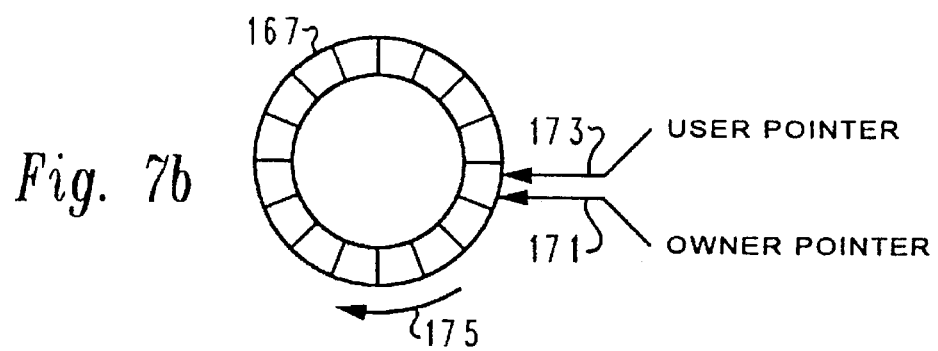
Figure 7C:
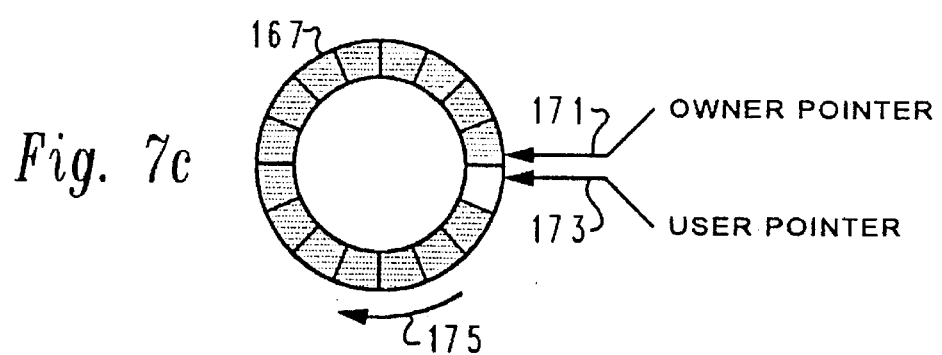

FIGS. 7a, 7b, and 7c depict the preferred operating rules which allow orderly use of data communication modules to transfer data between modular multimedia software tasks and multimedia end devices. In the preferred embodiment of the present invention, data communication modules are circular buffers which are used to pass data streams between two or more modular multimedia software tasks, or between one modular multimedia software task and one or more multimedia end device. As is shown in FIG. 7a, circular memory array 167 is composed of a plurality of bytes or words, which are graphically depicted by segments in circular memory array 167, such as memory segment 169. In FIGS. 7a, 7b and 7c, memory segments which have new data in them are depicted as shaded, while memory segments which have no new data stored therein are depicted in unshaded form.

In order to ensure an orderly communication of real-time and/or asynchronous data, one task is designated as the "owner" of any particular data communication module. A data communication module may have only one owner. The owner is the only task which is allowed to write to the data communication module circular memory array 167. The owner task controls an owner pointer 171 (or "write pointer") which identifies the last memory segment into which data has been written. One or more modular multimedia software task is, or are, identified as the "user" of a data communication module. The "user" task or end device controls a user pointer 173 (or "read pointer") which identifies the last memory segment in the circular memory 167 from which data has been read. Before an owner task writes data to circular memory array 167, the owner pointer is incremented to identify the next consecutive memory segment in the circular memory array 167. Before a user task reads data from circular memory array 167, the user pointer 173 is likewise incremented to identify the next memory segment in circular memory array 167 which is to be read. Data is read from and written to circular memory array 167 in only one direction, which is graphically depicted by arrow 175 in FIG. 7a.

FIG. 7b depicts an "empty" data communication module. All the data which has been written by the owner task to circular memory array 167 has been read or "consumed" by the user task. In this situation, the owner pointer 171 and the user pointer 173 will identify the same memory segment. FIG. 7c depicts a "full" data communication module. In this situation, the owner task has written data to all available memory segments in circular memory array 67. This situation can be identified when the owner's pointer 173 is one memory segment element behind the user's pointer. Incrementing a user or owner pointer moves the pointer forward in the buffer in the direction of arrow 175.

Figure 8A:
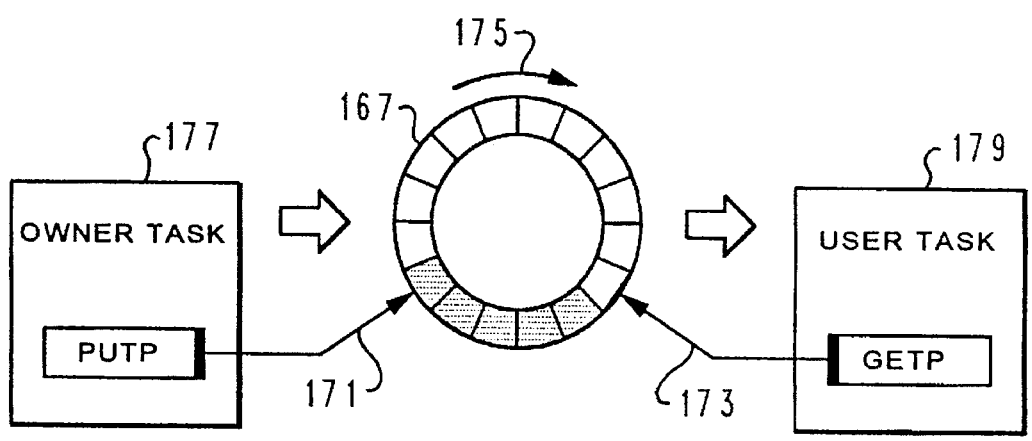
FIGS. 8a, 8b, 8c, and 8d graphically represent the four standardized communication protocols established for use with data communication modules in the preferred embodiment of the present invention.
Figure 8B:
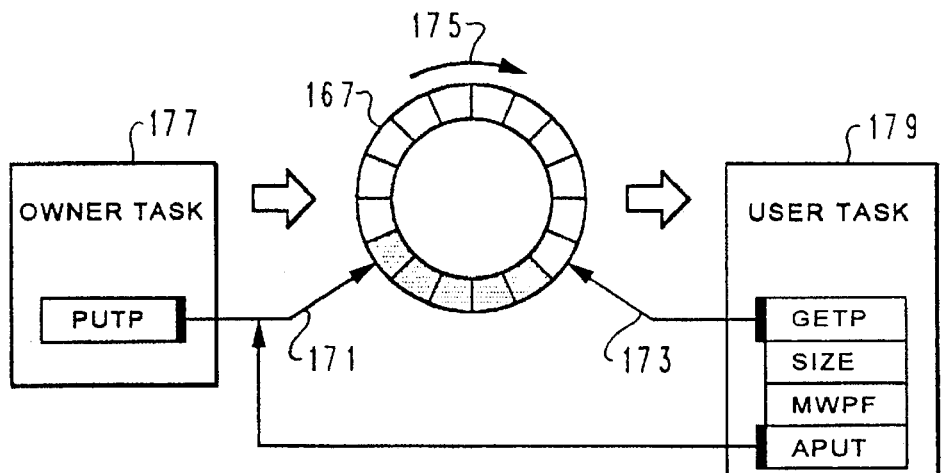
Figure 8C:
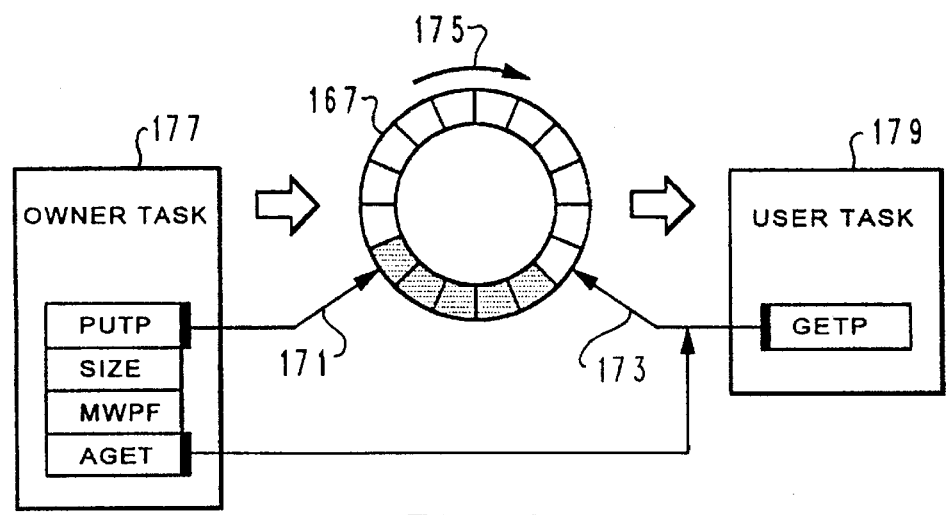
Figure 8D:
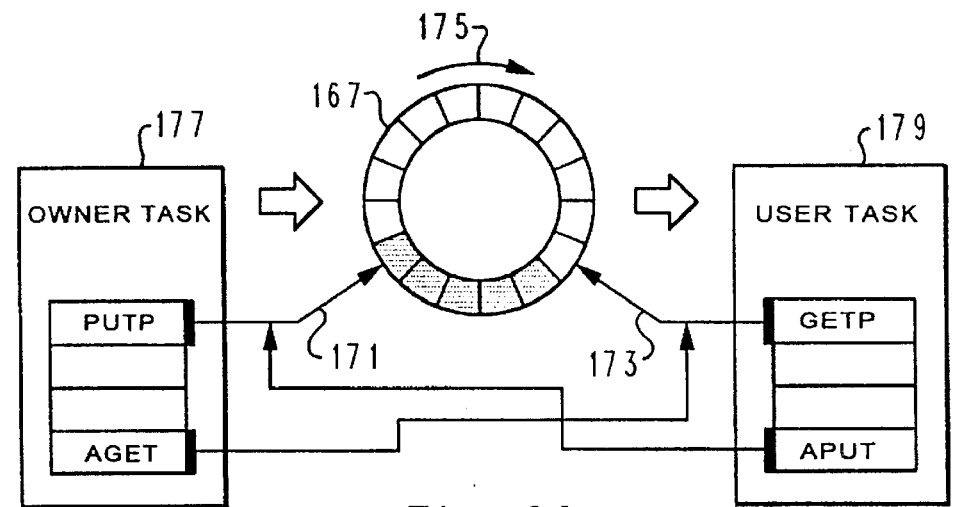

In order to facilitate the communication of real-time and/or asynchronous streamed data, four standardized communication protocols have been established for use with data communication modules. FIGS. 8a, 8b, 8c, and 8d graphically represent the four standardized communication protocols established for use with data communication modules in the preferred embodiment of the present invention. FIG. 8a represents a synchronous protocol. FIG. 8b represents an owner data driven protocol. FIG. 8c represents a user data driven protocol. FIG. 8d represents a safe data driven protocol.

With reference now to FIG. 8a, in the synchronous protocol, owner task 177 writes data to circular memory array 167 at a constant rate and user task 179 reads data at the same constant rate. Therefore, both owner task 177 and user task 179 run "open loop", with no feedback about the location of the owner pointer 171 (the address "PUTP") provided to the user task, and no feedback about the location of the user pointer 173 (the address "GETP") provided to the owner task. The owner task 177 assumes that the user task 179 is consuming data at the correct rate, while the user task 179 assumes that the owner task 177 is producing data at the correct rate. Neither owner task 177 nor user task 179 checks for "empty" or "full" buffer conditions, and neither owner task 177 nor user task 179 knows the position, or address, of the other task's pointer. It is therefore important that the owner task 177 and the user task 179 run from the same hardware interrupt source, and at the same sample rate, to assure that they will maintain precise synchronization evidenced by a uniform separation (over time) of the write pointer 171 and the read pointer 173. Only one owner task can write data to a data communication module operating in the synchronous protocol mode of operation, but any number of user tasks can be connected to the data communication module.

FIG. 8b represents the owner data driven protocol. In this protocol, owner task 177 writes to circular memory array 167 at its own rate. User task 179 is expected to keep up with owner task 177 and consume all the data that is produced by owner task 177 and written to circular memory array 167. Owner task 177 runs "open looped", never having any feedback on the location (that is, address) of read pointer 173, and never checking to determine if circular memory array 167 is "full" or "empty". Owner task 177 can write data to circular memory array 167 at a constant rate, or at a variable rate, up to a maximum prescribed rate. This maximum rate is specified in a "macro" which defines the data communication module in units of maximum words per frame "MWPF", as will be described in detail herebelow. The size of circular memory array 167 is also defined by the macro as "SIZE". The size "SIZE", maximum words per frame "MWPF", as well as the address of write pointer 171 "APUT" are all maintained by user task 179 and employed to ensure that user task 179 consumes all the data that is produced by owner task 177. User task 179 has the responsibility to ensure that circular memory array 167 never becomes full or overflows. If user task 179 falls behind, owner task 177 overwrites old data with new. Typically, user task 179 empties circular memory array 167 by reading all data that is available, or reads a block of data as soon as a complete block is available. As was stated above, user task 179 knows the address of write pointer 171 of owner task 177 and therefore can compare the location of pointers. If the address of write pointer 171 "PUTP" is equal to the address of write pointer 173 "GETP", then circular memory array 167 is "empty". Otherwise, circular memory array 167 contains data which should be consumed by user task 179.

The owner data driven protocol is useful when owner task 177 must produce data at some given rate, while user task 179 can adapt its consumption rate to match that of owner task 177. An example of an application requiring the owner data driven protocol is a modem that is receiving data from a telephone line and passing the data to another task for processing. The task that samples incoming data from the phone line must do so at precise fixed rates. The task that processes the data might have much less stringent timing requirements.

FIG. 8c depicts the user data driven protocol. In this protocol, user task 179 reads data at its own rate. Owner task 177 is expected to match the rate of user task 179, and must always keep enough data in circular memory array 167. User task 179 can read data at a constant or variable rate, but the rate must be less than or equal to a specified maximum. Owner task 177 is responsible for maintaining separation between write pointer 171 and read pointer 173, based upon the maximum data consumption rate, maximum words per frame "MWPF", of user task 179. User task 179 runs "open loop", and does not know the address "PUTP" of write pointer 171. In contrast, owner task 177 knows the address "AGET" of read pointer 173 of user task 179.

FIG. 8d depicts the safe data driven protocol mode of operation. In this protocol, both owner task 177 and user task 179 actively prevent pointer overrun. Owner task 177 will never write data to circular memory array 167 if the circular memory array 167 is determined to be "full" in view of the location of write pointer 171 and read pointer 173. User task 179 never reads data from circular memory array 167 if circular memory array 167 is determined to "empty" as determined by the relative position of write pointer 171 and read pointer 173. If owner task 177 passes data to user task 179 in blocks, such as sixteen samples per block, owner task 177 should wait until there is sufficient room in circular memory array 167 for a full block before beginning writing operations. User task 179 should wait until a full block of data is available for commencing reading operations. In this safe data driven protocol mode of operation, owner task 177 is apprised at all times of the address of read pointer 173. Conversely, user task is at all times apprised of the address of write pointer 171.

All connection to a data communication modules may be established and defined with regard to a data communication module macro which is depicted in Table 1. Each connection to a data communication module is defined with reference to the following labels and parameters:

(1) label;
(2) owner or user designation;
(3) size or minimum size;
(4) data communication protocols;
(5) a data addressing mode;
(6) a data format mode;
(7) a data sample rate;
(8) a maximum word per frame for either reading or writing data;
(9) a minimum pointer separation;
(10) a maximum delay between reading and writing operations;
(11) size of the data elements passing through the data communication module.

Each of these parameters will be discussed with reference to the macro which is set forth in assembler programming language in Table 1.

Label for the Data Communication Module

A label is required for designation of the data communication module, which is used to identify and distinguish a particular data communication module from other data communication modules which have been created to pass data between modular multimedia software tasks or between modular multimedia software tasks and multimedia end devices.

Owner or User Designation

It is required that the connection to a data communication module be identified as being either an owner-type or user-type. Both designations cannot be made.

Size

The size of the circular memory array is designated, in sixteen-bit words. In the preferred embodiment, the data communication module may have a size of 32, 64, 128, 256, 512, 1024, or 2048 words. For operation of data communication modules in the synchronous protocol mode of operation, it is important that the size of the buffer be at least twice the maximum words per frame that will be produced or consumed. In the alternative, the user may select a minimum buffer size for user-type data communication modules only. A user-type data communication module may connect to any owner-type data communication module that has a size greater than or equal to the minimum size (MINSIZE).

Protocols

Figure 9:
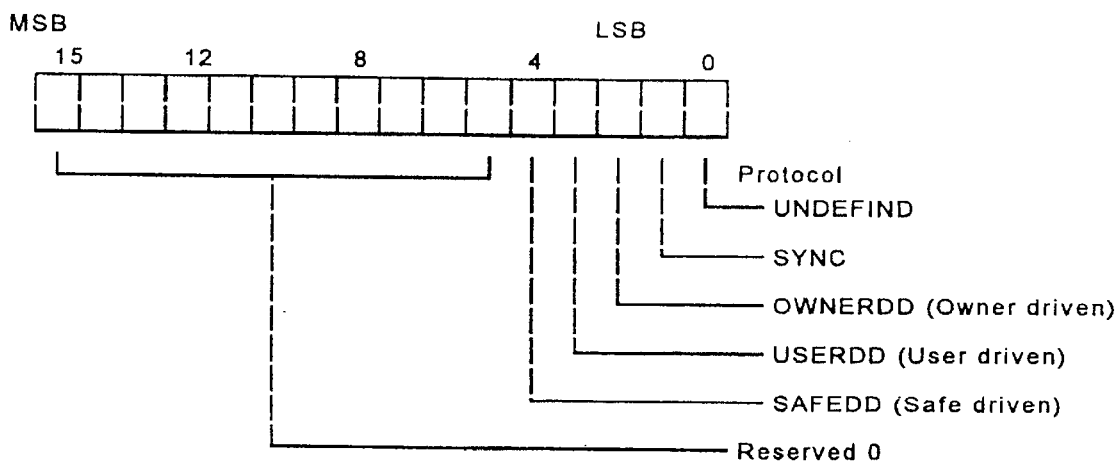
FIG. 9 graphically depicts a sixteen bit word of which the five least significant bits represent a data communication protocol selection.

As discussed above, four protocols are available for user selection, including: synchronous protocol, owner data driven protocol, user data driven protocol, and safe data driven protocol. FIG. 9 graphically depicts a sixteen bit word of which the five least significant bits represent a data communication protocol selection. A binary one in bit zero indicates that a protocol has not been selected. A binary one in bit one indicates that the synchronous protocol mode of operation has been selected by the user. A binary one in bit two indicates that an owner data driven protocol has been selected. A binary one in bit three indicates that the user has selected a user data driven protocol. Finally, a binary one in binary bit four indicates that a safe data driven protocol has been selected. The user may select more than one protocol, provided that the protocols are compatible. Table 2 graphically depicts protocol compatibility. As depicted therein, an owner-type task which is operated in a synchronous protocol mode of operation may be connected through a data communication module with a user-type task which is in either a synchronous protocol mode of operation or an owner data driven protocol mode of operation. Table 2 further indicates that an owner-type task which is operated in an owner data driven protocol mode of operation may only be coupled through a data communication module with a user-type task which is operated in an owner data driven protocol mode of operation. Table 2 further indicates that an owner-type task which is operated in a user data driven protocol mode of operation may pass data through a data communication module to a user-type task which is operated in any of the four identified protocol modes of operation. Finally, Table 2 indicates an owner-type task which is operated in a safe data driven protocol mode of operation may pass data to a user-type task which is operated in either the owner data driven protocol mode of operation or the safe data driven protocol mode of operation.

Data Addressing Mode

The data addressing mode identifies the mode that will be used in manipulating the data communication module pointer. The choices are "byte", "table", or "word". The owner-task and user-task must identify the same type of data addressing mode to allow connection.

Data Format Mode

The data format mode describes the format of data which is written into and read from the data communication 6 module. The owner task and the user task must specify the same mode; otherwise, the connection is not allowed. Data is viewed as packets of length N, where N is an integer. For example, setting N to 2 is one technique for allowing the transmission of left and right channels for stereo sound, or real and imaginary parts of complex numbers. Setting N to other integer values will allow the passage of larger sets of data within N components representative of different portions of a signal. Setting the data format mode to "universal" will allow the connection of the data communication module to any other data communication module, without regard to its particular mode selection for data format.

Sample Rate

The sample rate specifies the intrinsic sample rate of the data flowing through the data communication module. If both the user and owner specify non-zero sample rates, then the sample rate must be the same for both the owner task and the user task. If this is not so, the tasks should not be connected.

Maximum Words Per Frame

The maximum words per frame is the maximum number of words that will be produced or consumed each time the task executes. For example, if the owner task writes data at a constant rate of sixteen words per frame, then the maximum words per frame (MAXWPF) is sixteen.

Minimum Separation

The minimum separation is the minimum separation that can be tolerated between the owner pointer and the user pointer. For data communication modules operating in the synchronous protocol mode of operation, a good rule of thumb is to set the minimum separation equal to the maximum words per frame. If the owner task and the user task define different values for minimum separation, then the larger value should be used to synchronize the operation of the two.

Maximum Delay

The maximum delay is what one is willing to tolerate between the time an owner task writes data to the data communication module and the time the user task reads the data from the data communication module. The maximum delay may be specified as either "MAXDELF" or "MAXDELT", but not both. MAXDELT is measured in absolute time in units of nanoseconds, microseconds, milliseconds, or seconds. The unit of measure for MAXDELF is one frame or period of the task associated with the data communication module macro. For example, if an owner task runs once every eight interrupts from an eight kilohertz interrupt source, the frame, or period, of the task is determined to be one millisecond. The task can tolerate a delay of no more than three milliseconds between the time it writes to the data communication module and the time the data is consumed. The data communication module macro should specify the delay tolerance with either MAXDELT= 3MS or MAXDELF=3.

Stride

The stride is the size, in words, of the data elements passing through the data communication module. Stride defines the number of sixteen bit samples that comprise a single unit of information that is useful to a task. If N-dimensional data is being processed, stride should be set to equal N. For example, stereo audio must be processed in left and right pairs of samples, therefore stride should be set to two.

Figure 10:
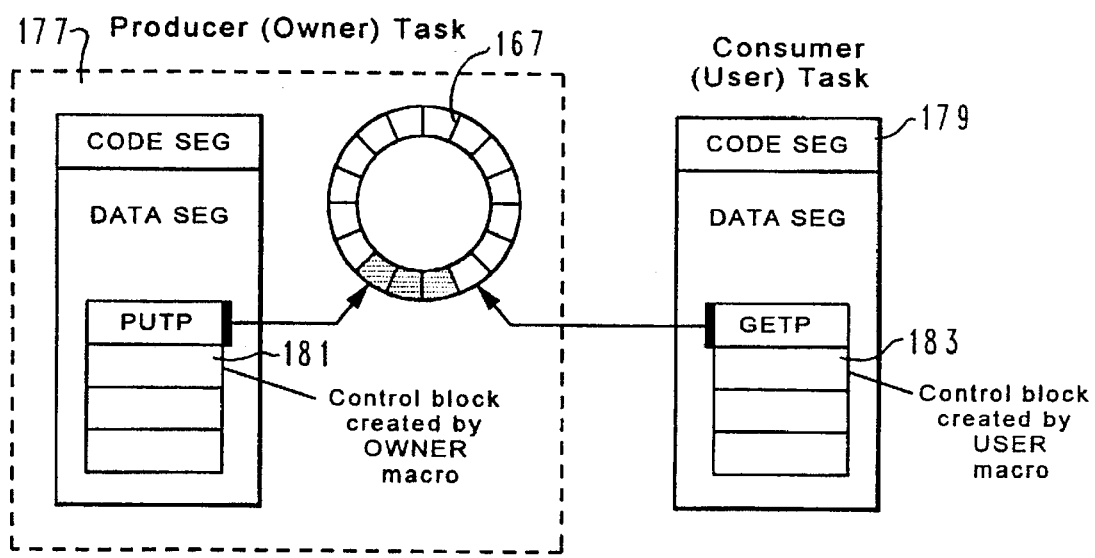
FIG. 10 represents the creation of control blocks in the owner and user tasks.

FIG. 10 represents the creation of control blocks in the owner and user tasks as a result of designations made in the macro (of Table 1) which defines a data communication module. Two macros (such as those shown in FIG. 10) must be defined in order to connect producer task 171 to circular memory array 169 and consumer task 179 to circular memory array 167. The owner-type macro creates control block 181 in the data segment of the owner task. The user-type macro creates control block 183 in the data segment of the user task. The control block varies in length from one to four words, depending upon the data communication protocol which has been selected. The different types of control blocks which may be generated are depicted in FIGS. 8a through 8d, which were discussed above. In FIG. 8a, the control block which is established in owner task 177 includes only for write pointer 171. The user task 179 includes only for read pointer 173. In FIG. 8b, the owner task 177 includes only for write pointer 171. In user task 179, the control block includes read pointer 173, the size of the circular memory array, the maximum words per frame, and the address of the write pointer 171. In FIG. 8c, the owner task 177 has a control block which includes write pointer 171, the size of the circular memory array, the maximum words per frame, and the address of the read pointer 173. User task 179 includes only read pointer 173. In FIG. 8d, the control block of owner task 177 includes the address of both write pointer 171 and the address for read pointer 173. User task 179 likewise includes the write pointer 171 and the address of read pointer 173.

Figure 15:
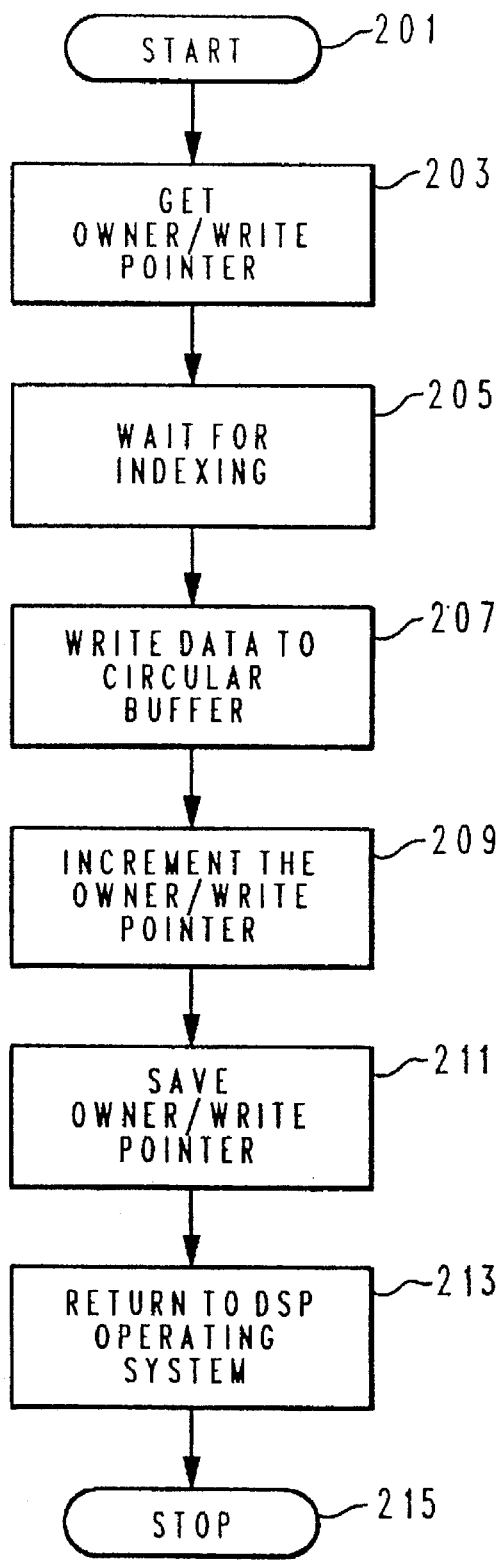
FIG. 15 is a flowchart representation of the task of writing to a data communication module in the synchronous protocol mode of operation.
Figure 16:
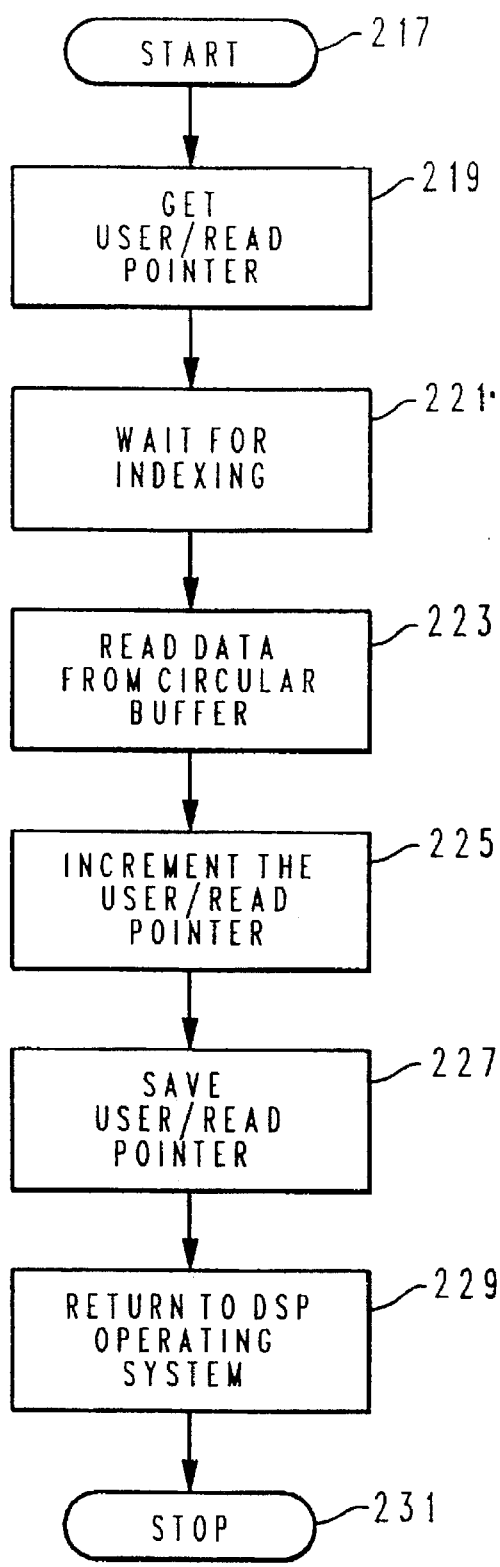
FIG. 16 is a flowchart representation of the task of reading from a data communication module in the synchronous protocol mode of operation.

One substantial benefit of having rigid data communication structures and standardized data communication protocols for data communication modules is that reading and writing operations to and from a data communication module may be constructed as simple, standardized software routines. FIG. 15 is a flowchart representation of the task of writing to a data communication module in the synchronous protocol mode of operation. FIG. 16 is a flowchart representation of the task of reading from a data communication module in the synchronous protocol mode of operation.

First with reference to FIG. 15, the writing operation starts at block 201. In block 203, the digital signal processor is instructed to get the owner/write pointer. The digital signal processor pauses at step 205 to allow for indexing. In block 207, the digital signal processor writes data to the circular buffer which comprises a selected data communication module. Then, in block 209, the digital signal processor increments the owner/write pointer to allow writing to the next segment of memory in the circular buffer. Blocks 207 and 209 are repeated until the write operation is completed. In block 211, the digital signal processor values of the pointer for use in future writing operations. In block 213, the routine returns to the digital signal processor operating system which is resident in the dsp memory. In block 215 the writing process stops.

When data is required to be read from the data communication module, the process starts in block 217 when the task is scheduled for processing by the dsp operating system. In block 219, the digital signal processor is instructed to get the user/read pointer. In block 221, the digital signal processor waits for indexing operations. In block 223, the digital signal processor reads data from the circular buffer. Next, in block 225, the digital signal processor increments the user/read pointer. Blocks 223, 225 are repeated until the read operation is completed. In block 227, the digital signal processor saves the value of the user/read pointer for use in future reading operations. Then, in block 229, the routine returns to the digital signal processor operating system which is resident in dsp memory.

Figure 17:
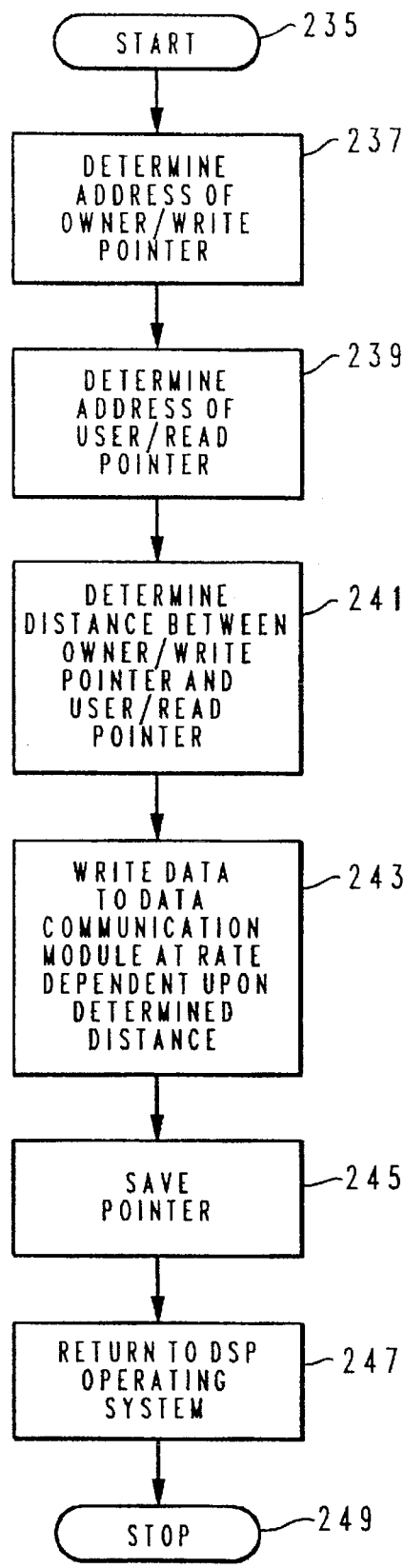
FIG. 17 is a flowchart representation of the task of writing to a data communication module in the user data driven protocol mode of operation.

FIG. 17 is a flowchart representation of the task of writing to a data communication module in the user data driven protocol mode of operation. The process starts at block 235 when the task is scheduled for execution by the dsp operating system. In block 237, the digital signal processor is instructed to determine the value of the owner/write pointer. Next, in block 239, the digital signal processor is instructed to determine the value of the user/read pointer. Then, in block 241, the digital signal processor is instructed to determine the distance between the owner/write pointer and the user/read pointer. In block 243, the digital signal processor is instructed to write data to the data communication module at a rate which is dependent upon the determined distance between the owner/write pointer and the user/read pointer. In block 245, the digital signal processor is instructed to save the value of the pointers for both the owner/write pointer and the user/read pointer. According to block 247, the route returns to the digital signal processor operating system which is resident in dsp memory. Finally, in block 249, the process stops.

Figure 18:
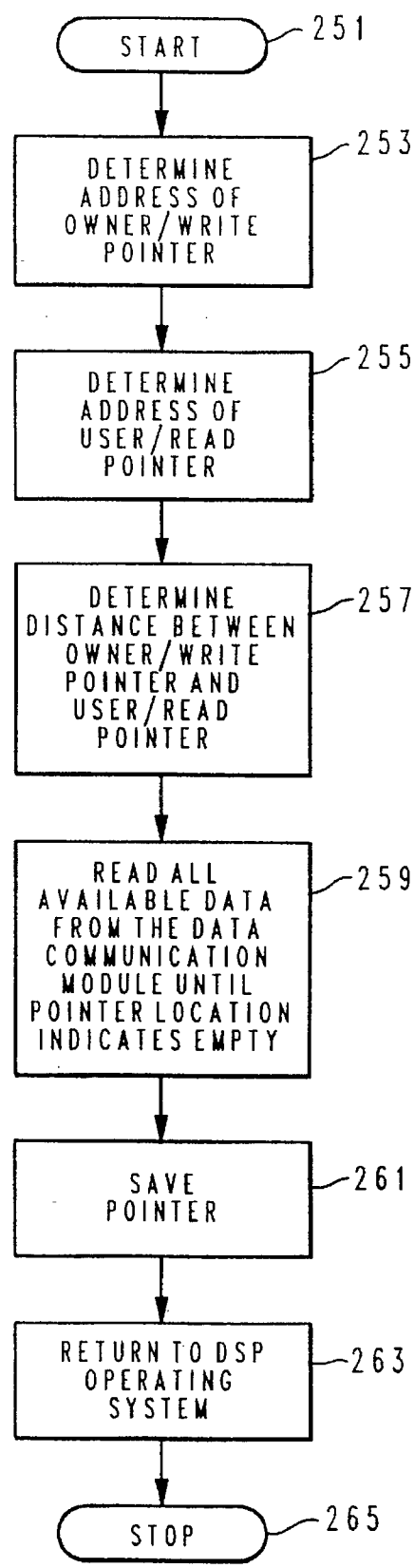
FIG. 18 is a flowchart representation of the task of reading data from a data communication module in either the owner data driven protocol mode of operation or the safe data driven protocol mode of operation.

FIG. 18 is a flowchart representation of the task of reading data from a data communication module in either the owner data driven protocol mode of operation or the safe data driven protocol mode of operation. The process begins in block 251, when the digital signal operating system schedules the routine for execution. In block 253, the digital signal processor is instructed to determine the value of the owner/write pointer. Next, in block 255, the digital signal processor is instructed to determine the value of the user/read pointer. In accordance with block 257, the digital signal processor is instructed to determine the distance between the owner/write pointer and the user/read pointer. Next, in accordance with block 259, the digital signal processor is instructed to read all available data from the data communication module until the pointer locations indicate that the circular memory array is "empty". Next, in block 261, the digital signal processor is instructed to save the value of the pointers for use in future reading operations. In accordance with block 263, the digital signal processor returns control to the digital signal processor operating system which is resident in dsp memory. Finally, in step 265, the process is discontinued.

Figure 11:
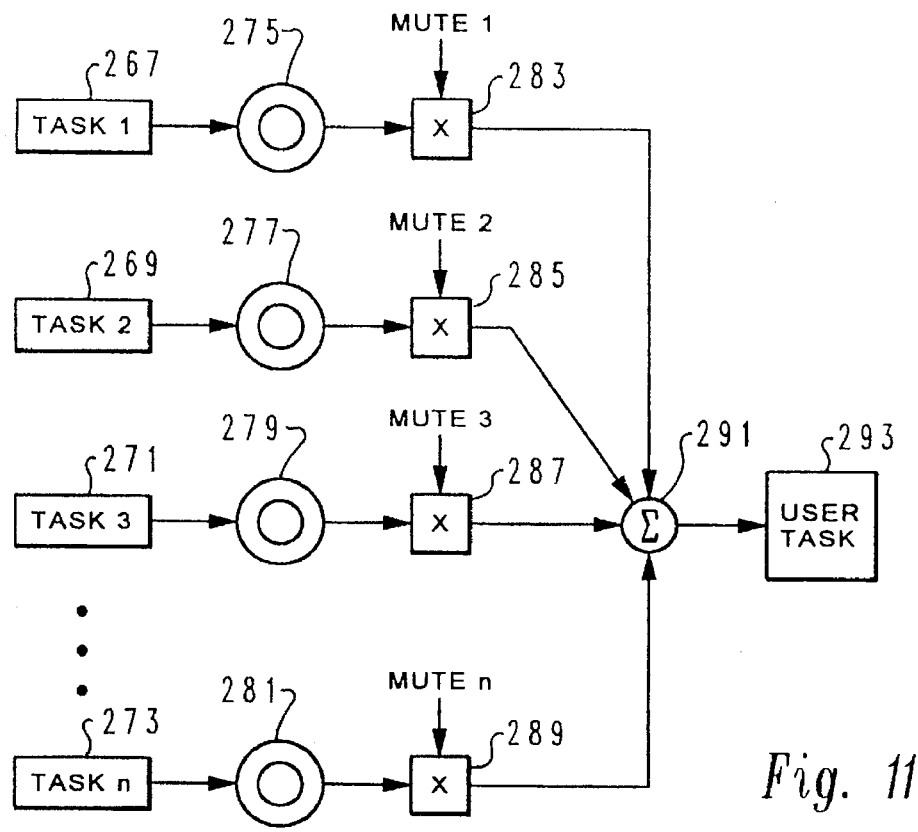
FIG. 11 is a block diagram representation of the communication of data streams from a plurality of modular multimedia software tasks through a plurality of data communication modules to a single user task through the use of a virtual data communication module.

As was discussed above, it is possible for a single user task to receive data which is streamed through a plurality of data communication modules. FIG. 11 is a block diagram representation of the communication of data streams from a plurality of modular multimedia software tasks 267, 269, 271, 273 through a plurality of data communication modules 275, 277, 279, 281 to a single user task 293 through the use of virtual data communication module 291. In the preferred embodiment of the present invention a plurality of mute tasks 283, 285, 287, 289 are connected between data communication modules 275, 277, 279, 281 and virtual data communication module 291. Mute tasks 283, 285, 287, 289 apply an attenuation or "mute" factor to the outputs of data communication modules 275, 277, 279, 281 to attenuate the output and prevent overflow during summing operations which are performed by virtual data communication module 291.

Figure 13:
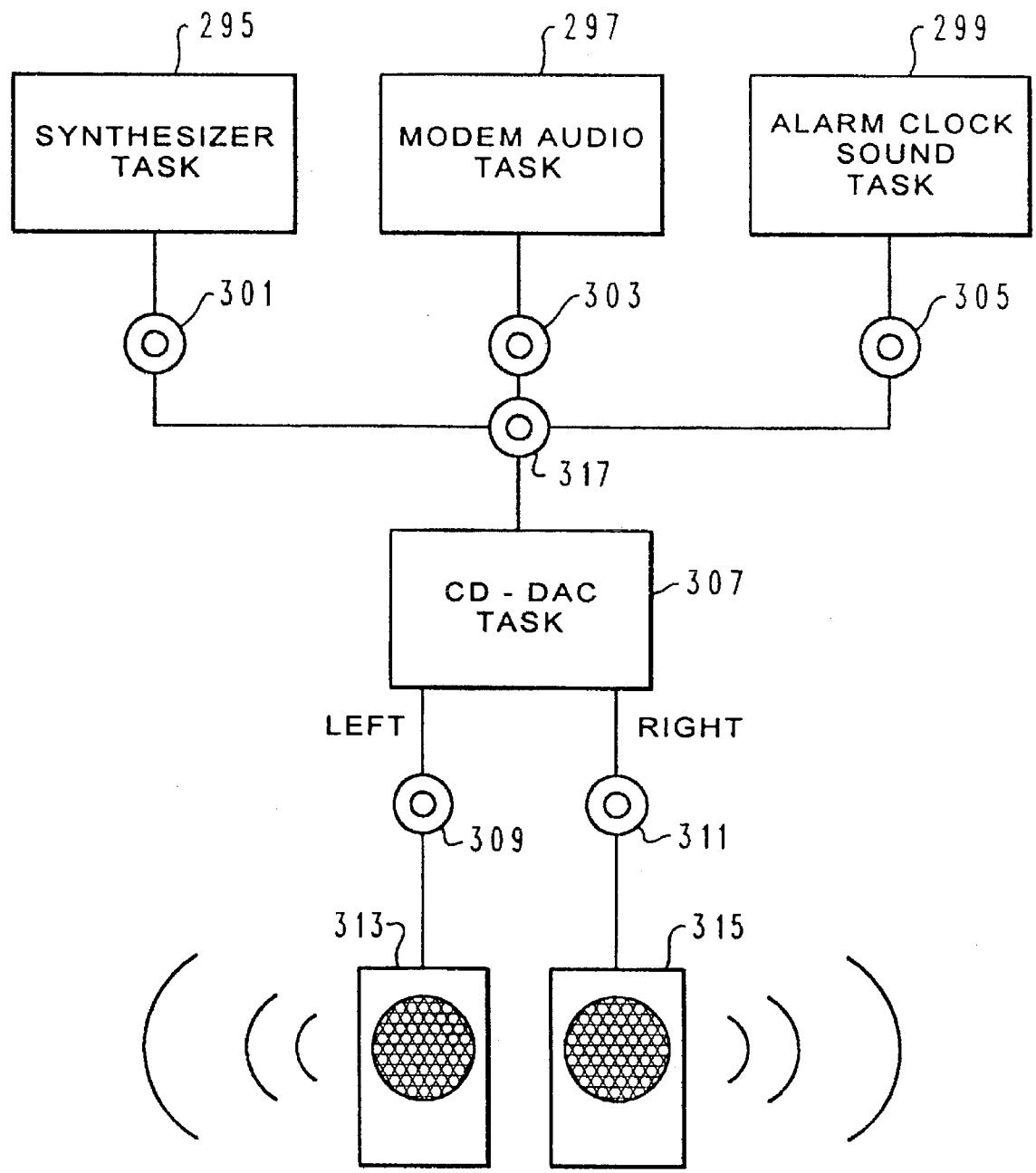
FIG. 13 is a block diagram representation of the multiplexing of audio outputs signals from a plurality of modular multimedia software task to a single CD-digital-to-analog converter through use of a virtual data communication module.

An example of this type of operation is depicted in FIG. 13, which is a block diagram representation of the multiplexing of audio output signals from a plurality of modular multimedia software tasks including synthesizer task 295, modem audio task 297, and alarm clock sound task 299 to a single CD-digital-to-audio converter task 307. Real-time and/or asynchronous streamed data is directed from synthesizer task 295 through data communication module 301 to virtual data communication module 317. Likewise, real-time and/or asynchronous stream data is directed from modem audio task 297 through data communication module 303 to virtual data communication module 317. Similarly, alarm clock sound task 299 directs real-time and for asynchronous streamed data through data communication module 305 to virtual data communication module 317. Virtual data communication module 317 operates to sum the various real-time and/or asynchronous streamed data outputs from synthesizer task 295, modem audio task 297, and alarm clock sound task 299 to provide them as an input to CD-DAC task 307. CD-DAC task 307 converts the digital output of virtual data communication module 317 into a digitized analog output which is passed through data communication modules 309, 311 before being directed to speakers 313, 315 to drive them and produce an audio sound output.

In the example of FIG. 13, the output of synthesizer task 295 may represent synthesized human voice sounds. The output of modem audio task 297 may represent the audible confirmation tones which are provided in most commercially available modems to indicate to the operator that the modem task is being performed. The alarm clock sound task 299 may represent an alarm clock sound which is provided at a predetermined time to alert the user of a calendared or scheduled event. The use of virtual data communication module 317 allows the simultaneous driving of speakers 313, 315 with the real-time and/or asynchronous streamed data from those tasks. This is a very advantageous feature, since it allows for the overlapping, simultaneous operation of a variety of multimedia tasks which drive multimedia end devices, without interfering with the operation of any of the particular tasks or end devices. In this manner, FIG. 13 depicts one of the real world advantages of the use of the data communication modules of the present invention in conjunction with the predefined and standardized data communication protocols and data communication rules which have been discussed.

Figure 12:
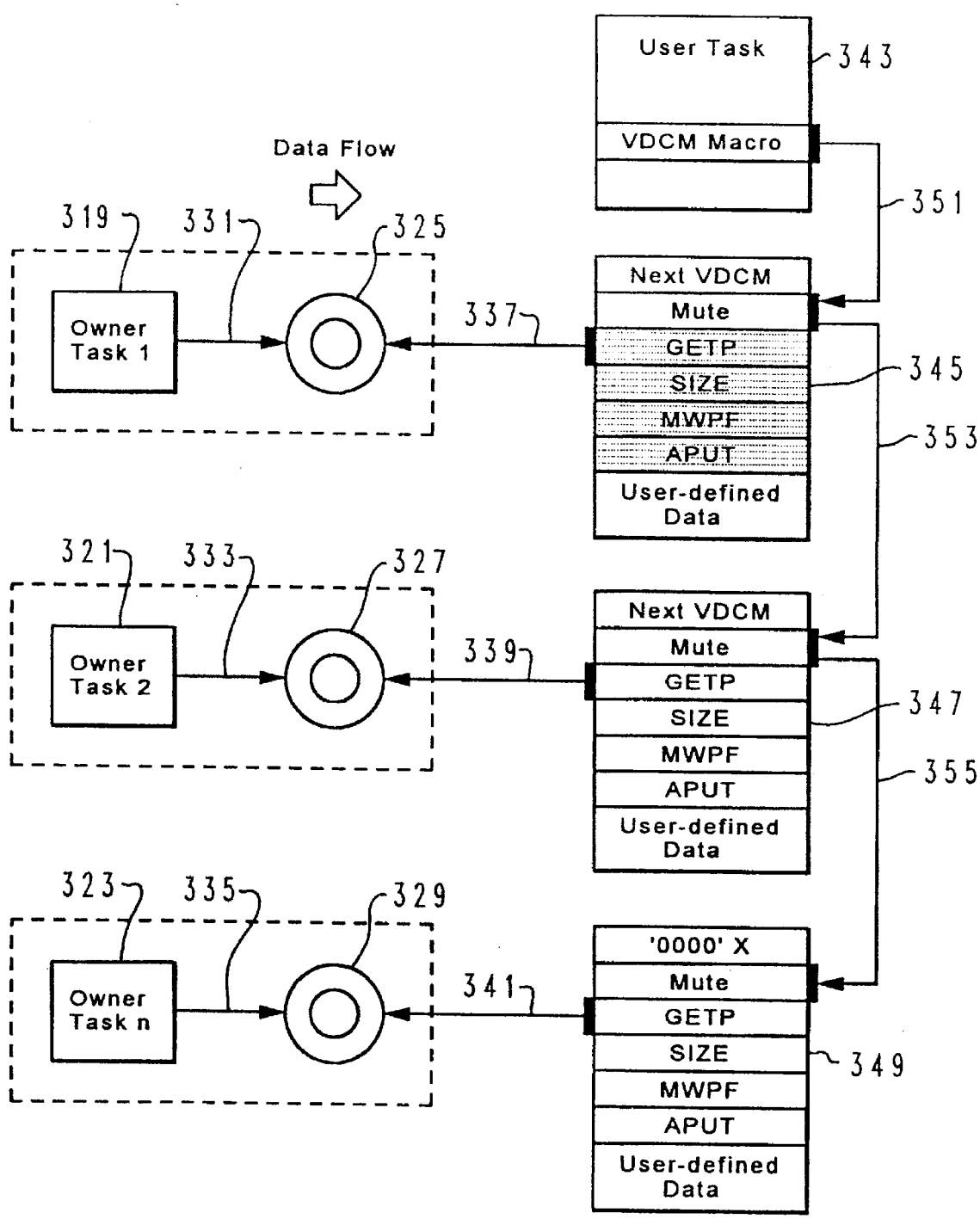
FIG. 12 is a more detailed block diagram representation of the operation of the virtual data communication module of FIG. 11.

FIG. 12 is a more detailed block diagram representation of the operation of the virtual data communication module of FIGS. 11 and 13. As is shown in FIG. 12, owner tasks 319, 321, 323 write streamed data to data communication modules 325, 327, 329 through the use of write pointers 331, 333, 335, respectively. Read pointers 337, 339, 341 read data from data communication modules 325, 327, 329 in accordance with the instructions and parameters of data macros 343, 345, 347, 349. As is shown, data macros 345, 347, 349 are coupled together by a linked-list through the virtual data communication module control blocks which are graphically depicted on the right hand side of FIG. 2. As is shown, link 351 connects user task 343 to data macro 345. Link 353 connects data macro 345 to data macro 347. Link 355 connects data macro 347 to data macro 349.

User task 343 includes an address (VDCM macro) to data macro 345. Data macro 345 defines the mute factor, the read pointer (GETP), the size of data communication module 325 (SIZE), the maximum data flow rate into data communication module 325 (maximum words per frame MWPF), and the address of write pointer 331 (APUT). Data macro 345 further includes a user-defined variable, which may or may not be used by user task 343 in the processing of the data from owner task 319. Data macro 345 includes the address to the next virtual data communication module. As is shown, data macro 347 includes the read pointer 339 (GETP), the size of data communication module 327 (SIZE), the maximum data flow rate into data communication module 327 (maximum words per frame (MWPF), and the address of write pointer 333 (APUT). DATA macro 347 further includes a user defined variable, which may be used by user task 343 in processing of the data from owner task 321. Data macro 347 includes the address to the next virtual data communication module. As is shown, data macro 349 includes the values of the read pointer 341 (GETP). Since data macro 349 represents the last data multiplexing task, its first location is set to "0000" to indicate that control should not be passed to any other data macro.

Table 3 identifies the basic components of a virtual data communication macro. The first component is the address to the "next virtual data communication module" which is identified as "next virtual DCM". The second component is the mute factor which is used to quiet the output during connection. The third component is a control block which identifies the user's pointer, the size of the circular memory buffer, the maximum words per frame, and the address of the owner's pointer. Finally, the user-defined data is provided to allow other variables.

Figure 14:
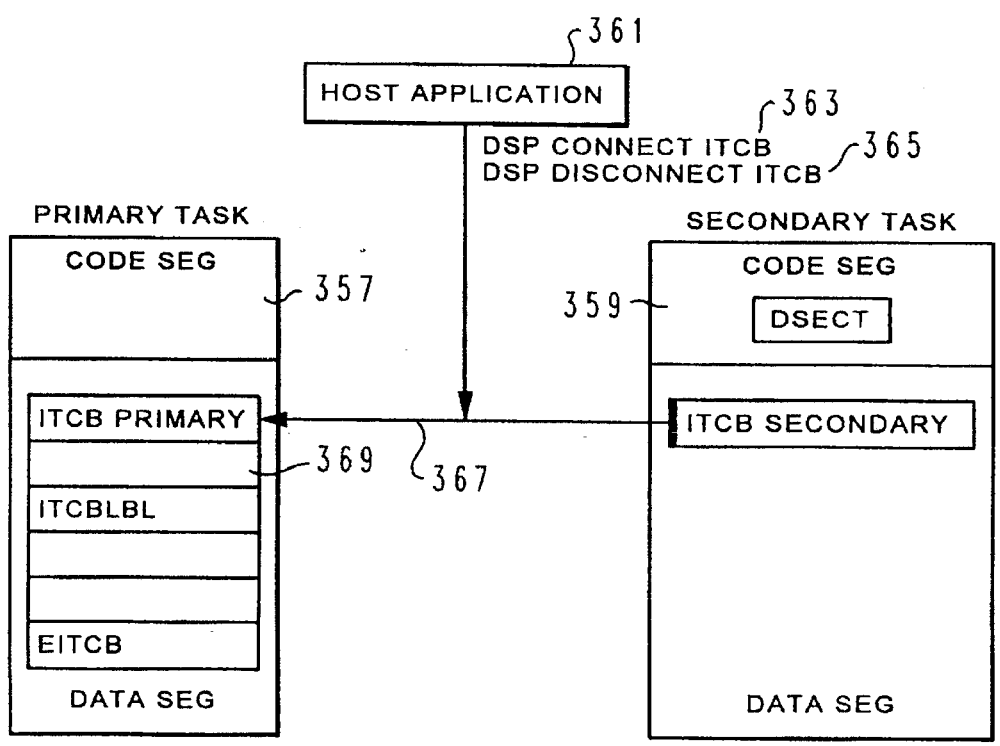
FIG. 14 is a block diagram representation of the operation of intertask control blocks.

As was discussed above, the data communication modules work in cooperation with intertask control blocks (ITCBs), which have heretofore not been fully discussed. FIG. 14 is a block diagram representation of the operation of intertask control blocks. Each task which is called for execution by the digital signal operating system has its own local data section that is not visible to other tasks. The intertask control block is a mechanism that allows one task to share a block of data with another task. Tasks that communicate through an intertask control block (ITCB) are called the "primary tasks" and the "secondary tasks". FIG. 14 is a block diagram depicting primary task 357, secondary task 359, and their interconnection. As is shown, host application 361, which is resident in the host CPU, uses application program interface (API) commands of "connect ITCB" and "disconnect ITCB" to connect and disconnect pointer 367 which points from the data segment of secondary task 359 to control block 369 in the data segment portion of primary task 359. Therefore, the control block 369 which passes status and control variables between selected modular multimedia software tasks is located in the primary task's data section. Primary task 357 contains macros which define the structure of the data. Secondary tasks 359 contains a macro which declares pointer 367 to the beginning of the control block 369.

As was discussed above, host application 361 connects secondary task 359 to primary task 357 with predefined digital signal processor commands. When the tasks are connected, digital signal processor manager 71 (of FIG. 3)

stores a pointer to control block 369 in the data section of secondary tasks 359. Host application 361 can connect or disconnect secondary task 359 from primary task 357 at any time. When the tasks are connected, secondary task 359 can read or write data to control block 369 of primary task 357. Secondary task 359 typically loads an index register with the pointer 367 to the base of control block 369, and addresses data within control block 369 as offsets from the base.

In summary, the general sequence required for creating and using an intertask control block is as follows:

(1) The intertask control block is coded in the primary task's data section using three macros, including: (1) ITCB PRIMARY; (2) ITCBLBL; and (3) EITCB, all of which will be discussed herebelow.

(2) The ITCB secondary is coded via a macro into the secondary task's data section. This macro allocates one word of memory for a pointer to the beginning of the ITCB data block in the primary task.

(3) At run time, the host system application connects the secondary task to the primary task by setting a call to the DSP manager. The DSP manager then loads the secondary task's pointer with the base address to the intertask control data block. Of course, the host application can connect or disconnect the secondary task at any time.

(4) After the tasks have been connected, the secondary task can read or write to the intertask control data block. The secondary task typically loads an index register with the pointer to the base of the data block and addresses data within the register as an offset from the base. The secondary pointer is set to zero when there is no connection.

The ITCB PRIMARY macro in the data section of the primary task identifies the beginning of the ITCB data block, while the EITCB macro identifies the end of the control data block. The ITCBLBL macro defines the properties of a single variable or a group of variables within a given ITCB control data block. The macro declares the following information:

(1) the ITCB protocol which has been established for the variables, regarding reading and writing operations;

(2) the maximum delay allowed for passing a variable from one task to another; and (3) a label or labels for the variable or variables.

Figure 19:
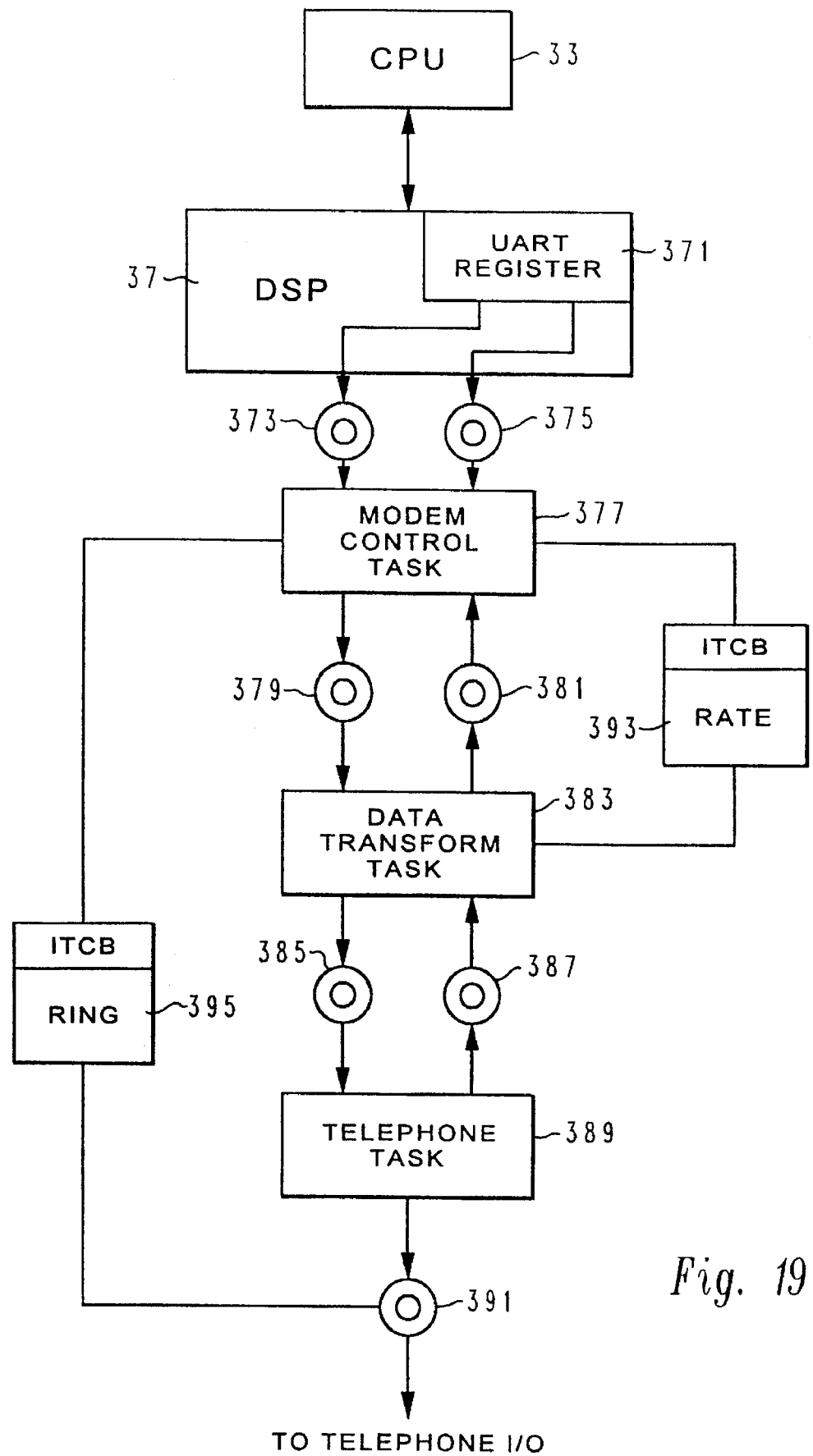
FIG. 19 is a block diagram representation of the operation of a plurality of modular multimedia software tasks, source of which virtualize the operation of conventional hardware multimedia end devices.
Figure 20:
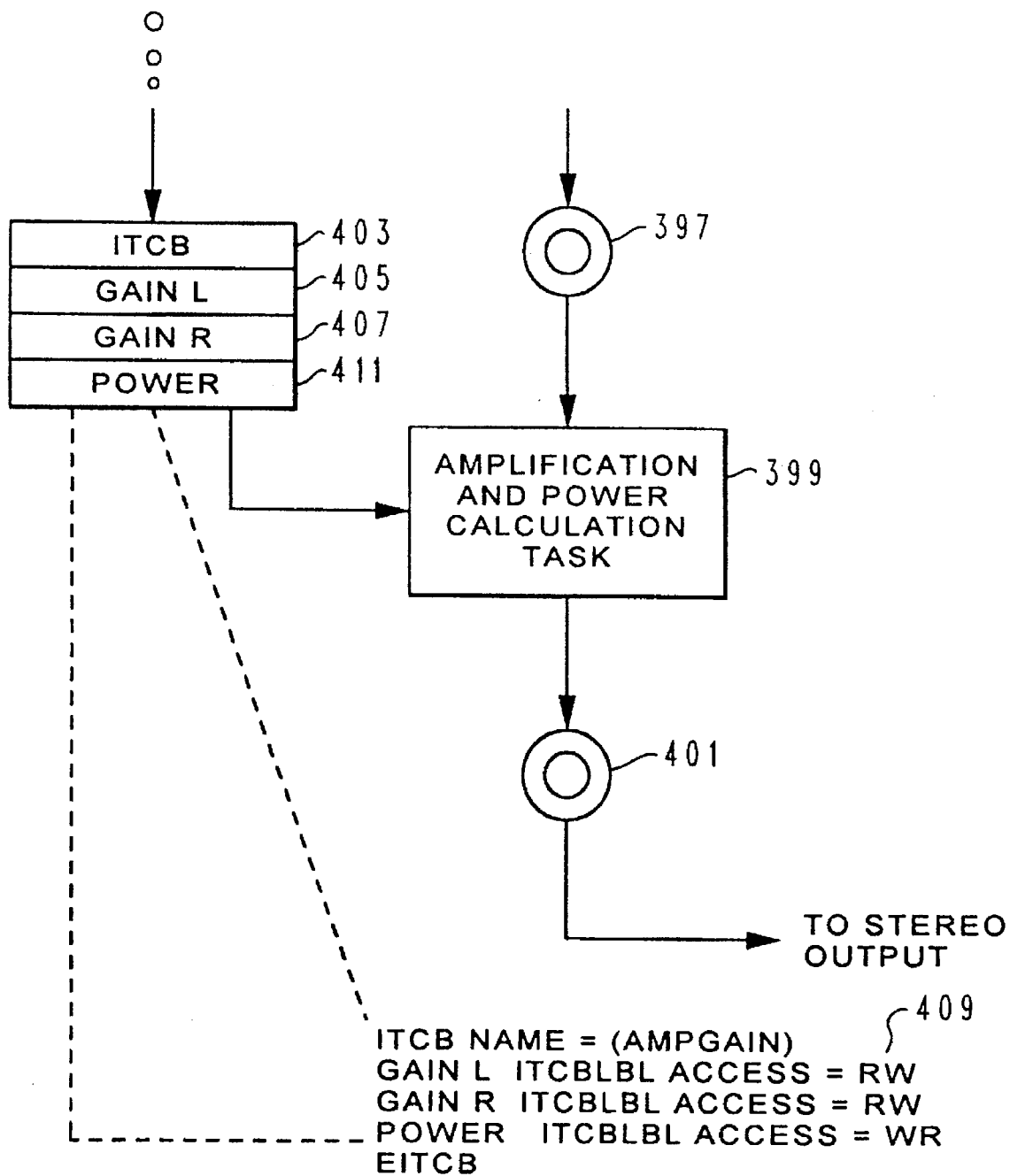
FIG. 20 is a block diagram representation of the operation f an audio output amplification task.
Figure 21:
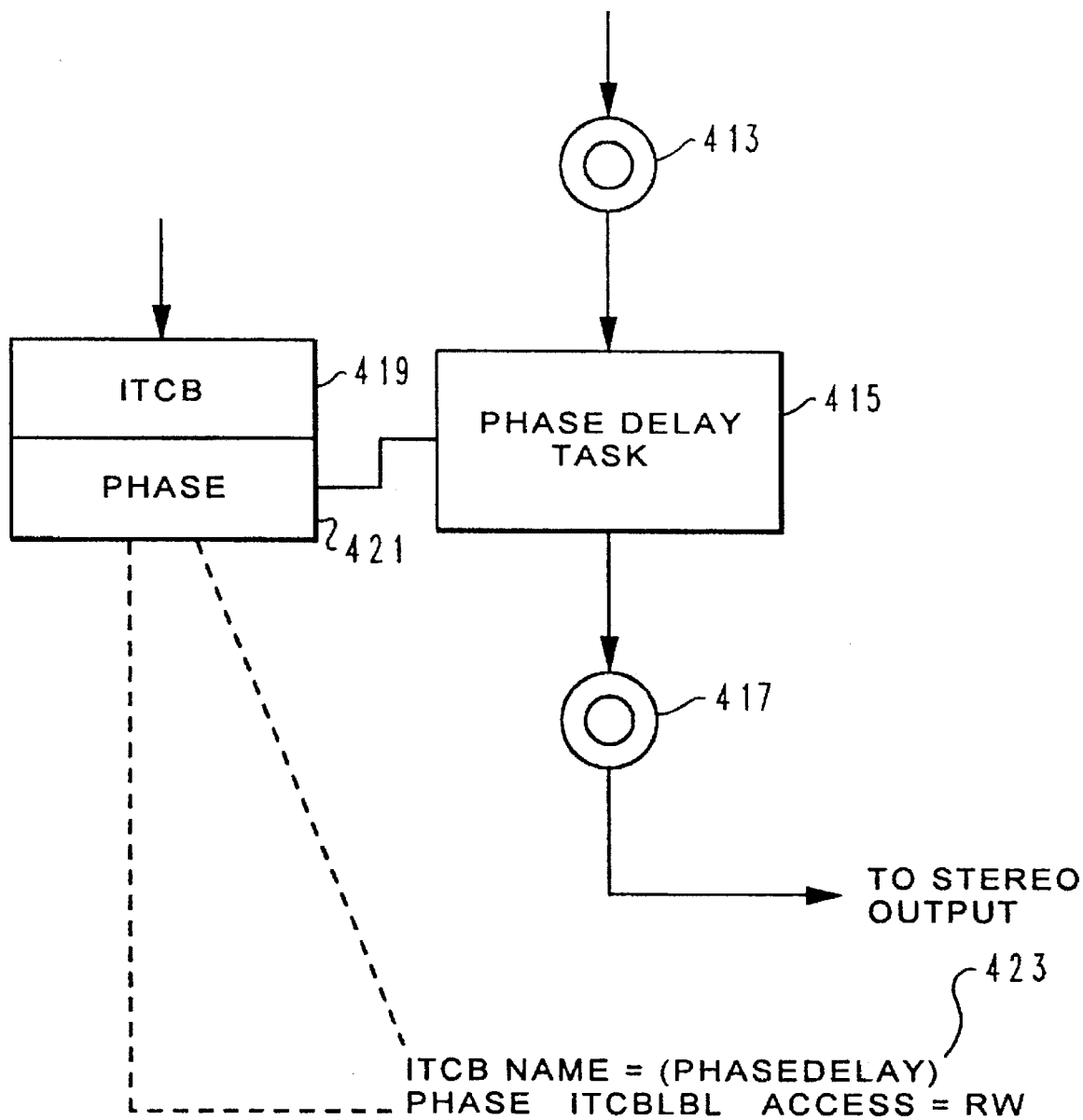
FIG. 21 is a block diagram representation of use of data communication modules and modular multimedia software tasks to control the phase difference between data streams.

The functions of the intertask control block, as well as the overall operation and advantages of the data communication modules, can best be understood with reference to the examples of FIGS. 19, 20, and 21. FIG. 19 is a block diagram representation of the operation of a plurality of modular multimedia software tasks, some of which virtualize the operation of conventional hardware multimedia end devices. FIG. 20 is a block diagram representation of the operation of an audio output amplification task. FIG. 21 is a block diagram representation of use of data communication modules and modular multimedia software tasks to control and manipulate phase differences in data streams.

With reference first to FIG. 19, there is depicted the operation of the multimedia data processing system of the present invention configured to perform the functions of a modem operating in full duplex mode. CPU 33 directs data to, and receives data from, digital signal processor 37. In particular, data is passed through universal asynchronous receiver transmitter (UART) register 371. Streamed data is directed from digital signal processor 37 through data communication module 373, which allows for continuous, real-time, and unidirectional communication of data to modem control task 377. Data communication module 375 serves to direct continuous, real-time and unidirectional data from modem control task 377 to digital signal processor 37. Data communication module 379 serves to direct streamed data from modem control task 377 to data transform task 383. Data communication module 381 serves to direct data from data transform task 383 to modem control task 377. Data communication module 385 serves to direct data from data transform task 383 to telephone task 389. Data communication module 387 serves to direct data from telephone task 389 to data transform task 383. Data communication task 389 communicates through data communication module 391 to a telephone input/output line. As shown, the data communication modules provide two data flow paths which correspond to data flow paths in a modem operating in full duplex mode.

Modem control task 377 represents a software state machine which is sensitive to a variety of variables, including a RING signal which may be received at data communication module 391 from the telephone input and output. Intertask communication block 395 links modem control task 377 to data communication block 391, and allows for the passage of a RING variable from data communication block 391 to modem control task 377 to alert modem control task 377 that a RING has been received on the telephone input/output line.

Data transform task 383 operates to receive digital data streams from modem control task 377 and produce an output stream which is representative of a digitized analog signal corresponding to the digital data stream. Intertask control block 393 is coupled between data transform task 383 and modem control task 377, and serves to communicate a RATE variable between those tasks. The RATE variable identifies the rate at which data should be output in digitized analog form from data transform task 383.

In accordance with the example of FIG. 19, the status indicator RING and the control variable RATE are passed between these tasks and data communication modules to ensure the coordinated operation of the modular multimedia software tasks. As is shown in FIG. 19, the functions of a conventional telephone may be simulated in software by the modular multimedia software task telephone task 389. Likewise, modem control task 377 simulates the conventional hardware and software functions of conventional modems. It is thus apparent that the present invention is useful in "virtualizing" various conventional hardware end devices, thus providing the user with an enhanced flexibility over existing prior art systems. The user may code tasks to be performed by the CPU and the digital signal processor which would have been performed ordinarily by conventional multimedia end devices. Considerable savings can be obtained by "virtualizing" hardware devices by software routines which perform the conventional functions of the hardware devices. The end users are provided with enhanced control over the multimedia environment using this technique to virtualize a variety of multimedia end devices.

FIG. 20 provides an example of the use of the ITCB protocols used to determine whether tasks can write to or read from a control variable. As is shown, data communication module 397 communicates streamed data into amplification and power calculation task 399. Data communication module 401 receives the output of amplification and power calculation task 399 and directs it to a stereo output. Intertask control block 403 communicates variables from another (undisclosed) task to amplification and power calculation tasks 399.

Intertask control block 403 includes two variables: left gain 405 and right gain 407 which are identified respectively as "GAIN L" and "GAIN R". The ITCBLBL macro is depicted as connected to ITCB 403 by phantom lines. This macro identifies the name of the intertask control block as "AMPGAIN". It also identifies the first variable as "GAIN L" and identifies the read/write nature of this variable as "RW". The ITCBLBL macro identifies the second variable as "GAIN R", and identifies the read/write protocol for access as being "RW". Furthermore, the ITCBLBL macro identifies a third variable as "POWER" which has a read/write access protocol of "WR".

The access protocol of "RW" for GAIN L and GAIN R identifies that the primary task (amplification and power calculation task 399) may read the GAIN L and GAIN R variables from the ITCB 403. This access protocol also identifies the secondary task (the undisclosed task) as capable of writing variables to the "GAIN L" and "GAIN R" variable locations. In this manner, the user may have multimedia software applications which control tasks which may write variables to "GAIN L" and "GAIN R" to modify the gain which is employed by amplification and power calculation task 399, and which result in amplification of the data stream which is provided by data communication module 397. If, for example, GAIN L and GAIN R are set to two, the values of data received by amplification and power calculation task 399 is amplified by factor of two. The secondary task (that is, the undisclosed task) may write variables to the GAIN L and GAIN R variables, and thus may modify them to a higher or lower number to modify the gain of amplification and power calculation task 399.

As suggested by its title, amplification and power calculation task 399 will calculate the power output of the signal provided to data communication module 401. This power variable 411 may be communicated to the secondary task by writing it to the "POWER" variable, periodically. As the power value changes, the changes are reflected by modification of the "POWER" variable. As is shown by this example, the ITCBLBL macro determines a read/write access protocol which determines which of the primary and secondary tasks may write to a variable, and which of the primary and secondary tasks may read from a variable.

As is shown in FIG. 21, the data communication modules and intertask control blocks of the present invention may be employed to alter the phase property of a stream of data. As is shown, data communication module 413 directs streamed data to phase delay task 415, which introduces a predetermined and variable amount of phase delay. Phase delay task 415 produces a streamed data output which is directed to data communication module 417 which directly or indirectly provides it to a stereo output. Intertask control block 419 couples phase delay task 415 to another (undisclosed) task. The "PHASE" variable 421 is defined by ITCB 419, and in particular by ITCBLBL macro 423, which names the ITCB 419 "PHASEDELAY", and which defines the access protocol as "RW". According to this protocol, the primary task may read the value of the "PHASE" variable 421, and the secondary task may write values to the "PHASE" variable 421. If the phase delay task 415 is the "PRIMARY" task, it may read the value of the "PHASE" variable 421, but may not write to it. In this manner, a user may construct a multimedia application which allows him or her to introduce or remove a selected amount of phase delay to any particular data stream output from any modular multimedia software task or from any multimedia end device. The significant advantage of this operation is that troublesome phase delays in a multimedia applications may be eliminated by intelligent use of phase delay tasks. Thus, synchronization problems may be avoided altogether.

Figure 22:
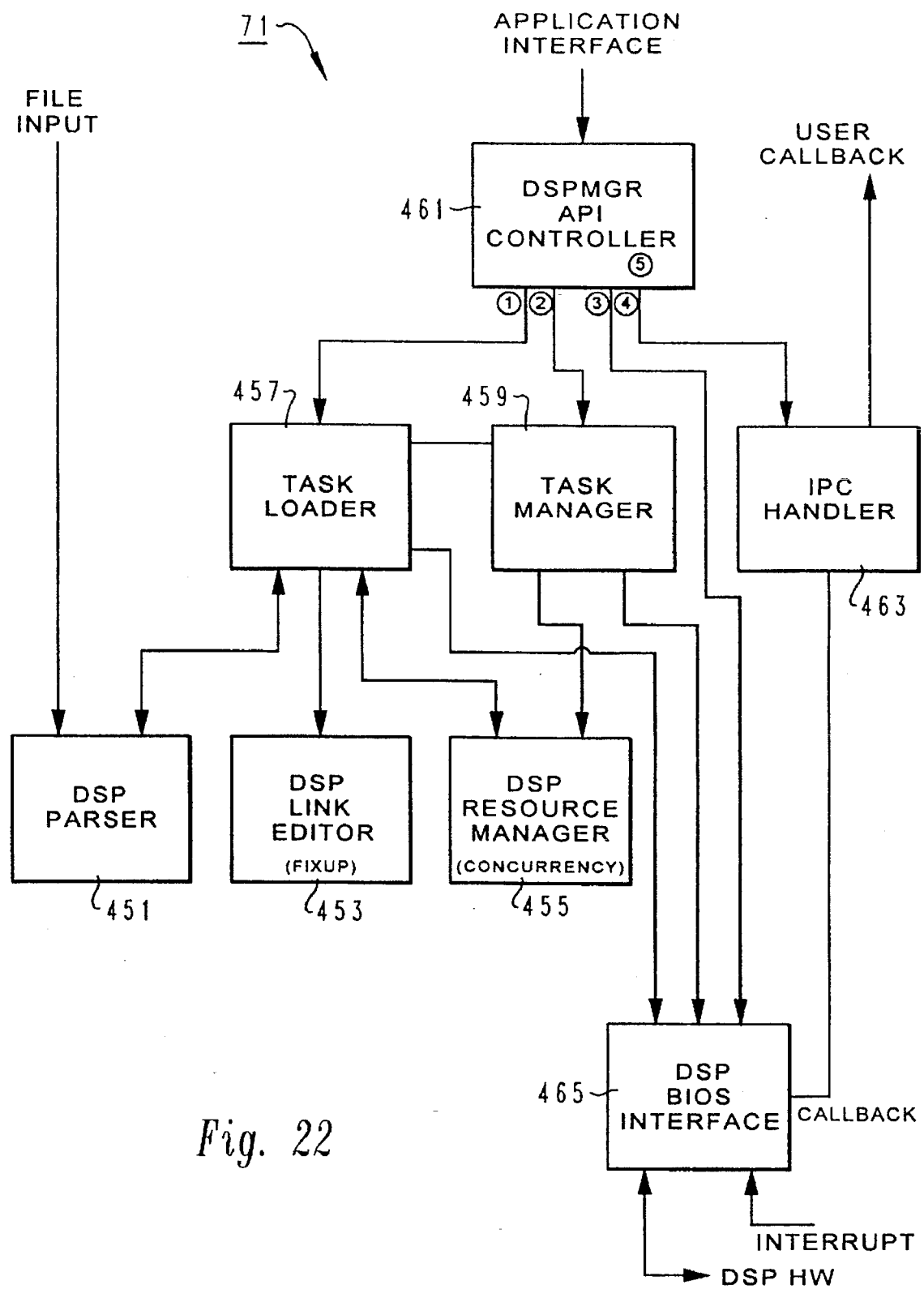
FIG. 22 is a block diagram representation of the digital signal processor manager program of FIG. 3.

As is shown in FIG. 3, digital signal processor manager 71 is resident in the host CPU, and operates to control the loading for execution of modular multimedia software tasks to digital signal processor 37 (of FIG. 2). As is shown in FIG. 22, digital signal processor manager program 71 is composed of a plurality of functional blocks which cooperate together to control the loading and execution of modular multimedia software tasks. The blocks which cooperate together include digital signal processor parser 451, digital signal processor link editor 453, digital signal processor resource manager 455, task loader 457, task manager 459, digital signal processor manager application program interface controller 461 (DSPMGR API controller), interrupt and processor call back handler 463, and digital signal processor BIOS interface 465. Each of these functional blocks is depicted in greater detail in FIGS. 23 through 30.

With reference again to FIG. 22, digital signal processor manager API controller 461 receives application program interface (API) commands from multimedia application, and routes the application program interface (API) commands to the appropriate functional blocks. There are five broad categories of application program interface commands. Category No. 1 includes commands which are directed between digital signal processor manager API controller 461 and task loader 457. Category No. 2 of API commands include commands which are passed from digital signal processor manager API controller 461 to task manager 459. Category No. 3 of API commands are those which are passed from digital signal processor manager API controller 461 to the digital signal processor BIOS interface 465. Category No. 4 of API commands are those which are passed between digital signal processor manager API controller 461 and IPC handler 463. Category No. 5 of API commands include those which provide status and other information to DSP manager 71, and which are especially useful in housekeeping and debugging operations, but which are not especially important for a full understanding of the present invention.

Table 4 identifies the five broad categories of application program (API) commands which allow digital signal processor manager program 71, which is resident in the host CPU, to coordinate and control the operation of digital signal processor 37.

With reference to Table 4, the Category No. 1 commands include: dsp allocate seg; dsp initiation; dsp load module; dsp load task; and dsp load segment. The dsp allocate segment is a command which instructs the digital signal processor to set aside memory for a particular task. The dsp initiation command initializes the digital signal processor by clearing registers, resetting the processor, and loading the operating system. The dsp load module command loads a module of selected tasks (see FIG. 4). The dsp load task command instructs the digital signal processor to load the data segments and instruction segments which make up a single task. The DSP load segment command instructs the digital signal processor to load a single segment (that is, a small block of instructions and/or data). As is shown in FIG. 22, the Category No. 1 commands are passed from digital signal processor manager API controller 461 to the task loader 457, which is depicted in greater detail in block diagram form in FIG. 30.

Figure 30:
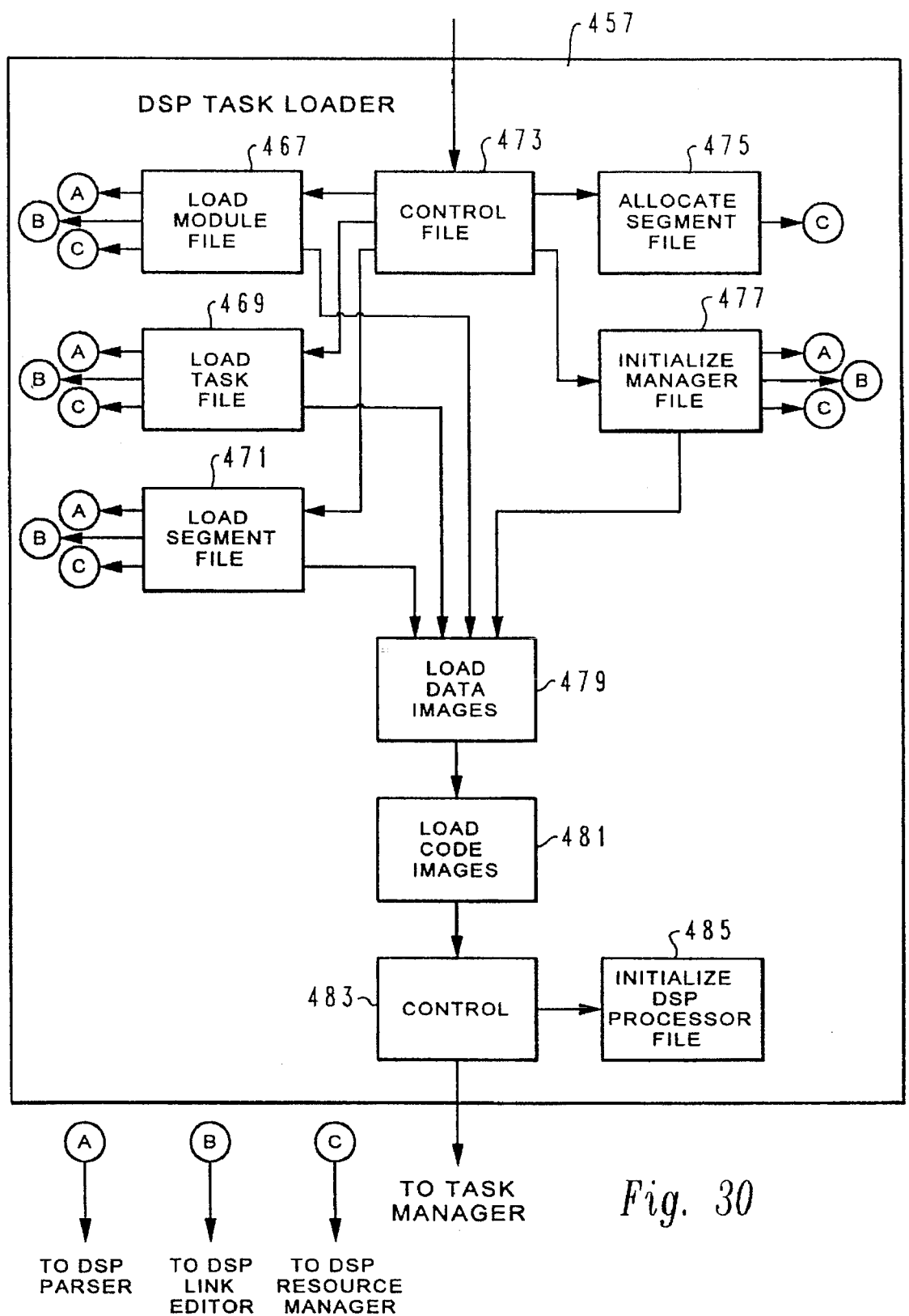
FIG. 30 is a detailed block diagram representation of the DSP task loader Of FIG. 22.

As is shown in FIG. 30, dsp task loader 457 includes control file 473 which receives the APIs, and calls a variety of other files as needed. Load module file 467 performs the task of loading a module of tasks to the digital signal processor. The load task file 469 loads a particular task to the digital signal processor for execution. The load segment file 461 loads a particular segement to the digital signal processor.

The allocate segment file 475 allocates a particular portion of memory for receipt of a particular task. The initialize manager file 477 selectively initializes the digital signal processor. The load module file 467, load task file 469, and load segment file 471 communicate and cooperate with dsp parser 451, dsp link editor 453, and dsp resource manager, all of which will be discussed herebelow. The load data images block 479, load code images block 481, and control block 483 cooperate together to provide task manager 459 with data, instructions, and control parameters which is to be passed through the dsp BIOS interface 465 for loading to the digital signal processor.

As is shown in Table 4, the Category No. 2 commands include eleven different commands. All of these commands are communicated from digital signal processor manager API controller 461 to task manager 459. The dsp change CPF command allows a change in the number of cycles per second of the digital signal processor allocated to a particular task. The dsp change DMA command allows for change in the amount of memory resource allocated for direct memory access operations. The dsp change module state command allows for a change in state of a modular grouping of a plurality of multimedia software tasks. The available states include "active", "standby", and "inactive". A task that is "active" is one that is to be executed by the digital signal processor immediately upon loading. A task that is in the "standby" state is one which is scheduled for execution at a special standby entry point. A task that is "inactive" is a task that is not scheduled. The dsp change task command allows for the change in state of a single multimedia software task between the "active", "standby" and "inactive" states.

The dsp connect DCM command allows for the connection of a particular data communication module to a particular task and/or multimedia end device. The dsp connect ITCB command allows for the connection of an intertask control block between primary and secondary tasks. The dsp disconnect DCM command and the dsp disconnect ITCB command allow for the disconnection of data communication modules and intertask control blocks, respectively. The dsp free module, dsp free task, and dsp free segement commands stop the execution of a module of tasks, a single task, and a single segment respectively, and disconnect them from data communication modules, intertask control blocks, and direct memory access connections which have been previously established for them and frees all allocated resources.

Figure 28:
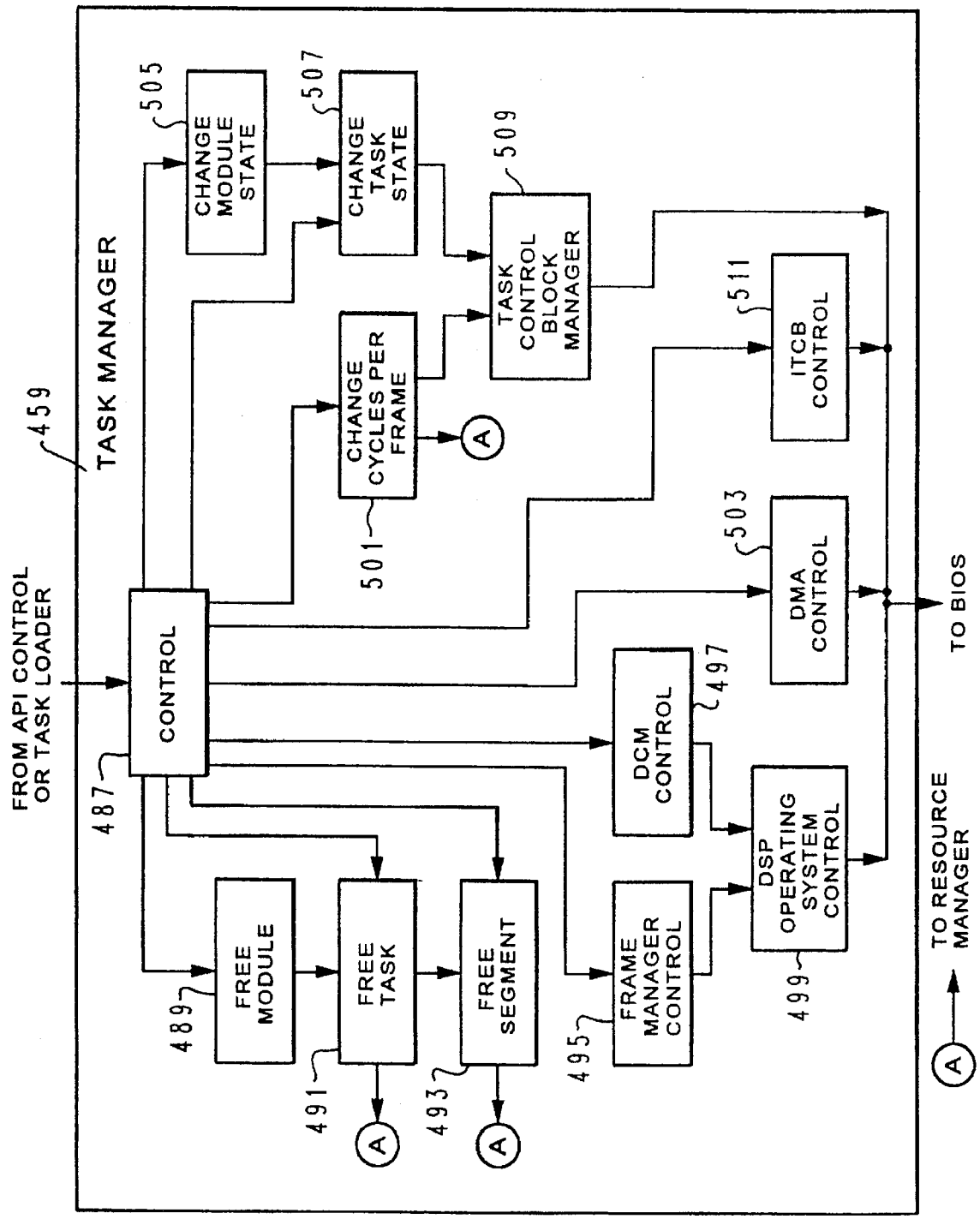
FIG. 28 is a detailed block diagram representation of the task manager of FIG. 22.

As is shown in FIG. 22, the dsp manager API controller 461 communicates Category No. 2 commands to task manager 459, which is depicted in greater detail in block diagram form in FIG. 28. With reference now to FIG. 28, control block 487 receives API commands from digital signal processor manager API controller 461, and routes them to appropriate modules and files for performing particular tasks which relate to the management of tasks in the digital signal processor. As is shown, commands which require the freeing of a module, task or segments are routed to the appropriate file of: free module file 489, free task file 491, and free segment file 493. Likewise, API commands which require the changing in state of modules and tasks are routed to the appropriate ones of the change module state file 505 and change task state file 507. Commands which require the change in cycles per frame are passed to the change cycles per frame file 501. API commands which require the connection or disconnection of data communication modules, direct memory access, or intertask control blocks are routed to the appropriate one of DCM control file 497, DMA control file 503, and ITCB control file 511. The API command which calls for a change in the cycle's per frame is routed to the frame manager control file 495. Note that the data communication module control file 497 and the frame manager control file 495 are routed through the digital signal processor operator control file 499 before passing through the digital signal processor BIOS.

As is shown in Table 4, Category No. 3 of API commands includes three commands. The dsp transfer command determines whether data instructions can be written to or read from data memory 43 and instruction memory 41 (both of FIG. 2). The dsp reset command stops the digital signal processor and resets the location counter to zero. The dsp run command starts the processor running. As is shown in FIG. 22, these command are communicated between the dsp manager API controller 461 and the digital signal processor BIOS interface 465, which is shown in greater detail in block diagram form in FIG. 26.

Figure 26:
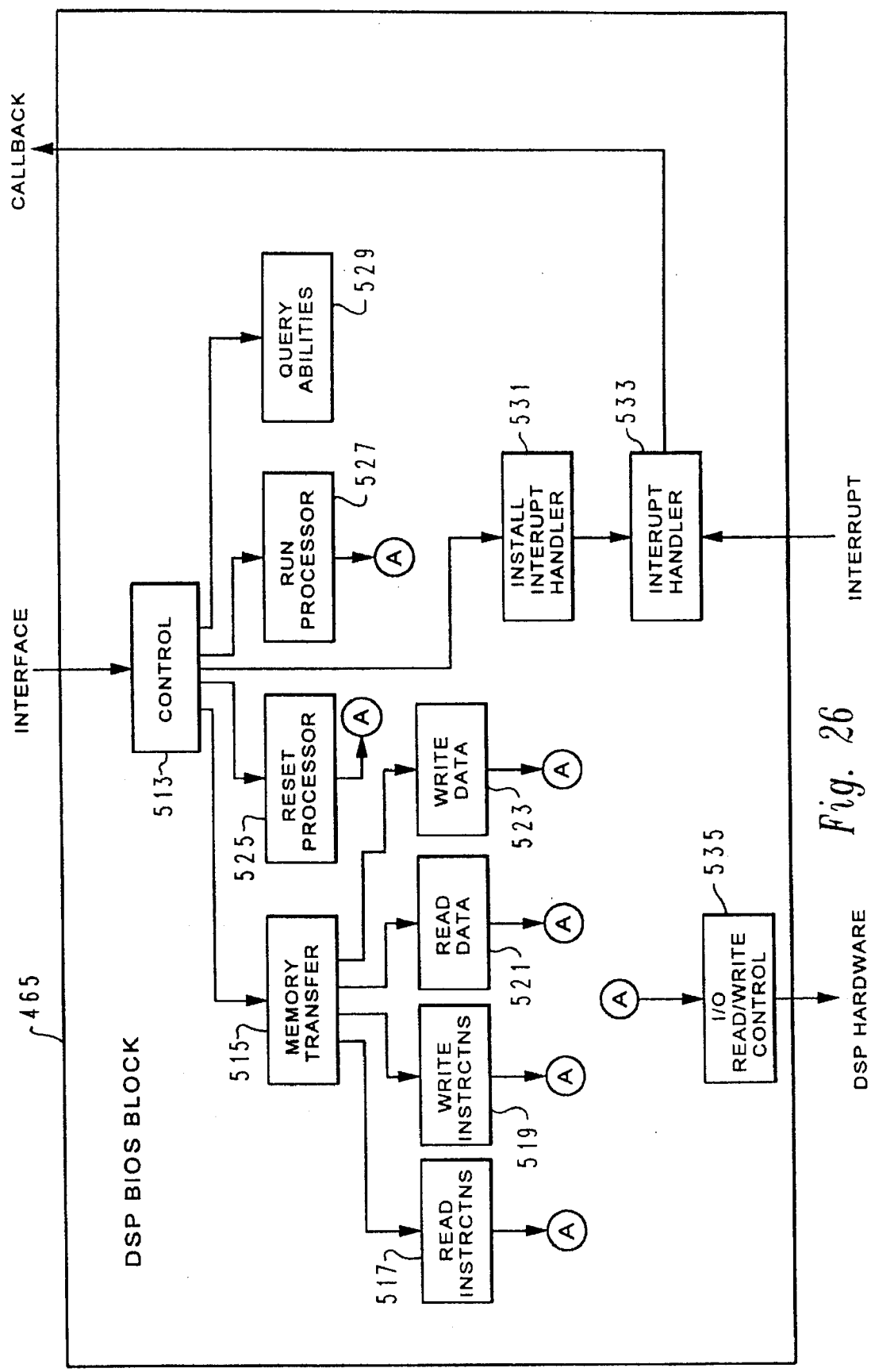
FIG. 26 is a detailed block diagram representation of the DSP BIOS block of FIG. 22.

With reference now to FIG. 26, dsp BIOS interface 465 is shown to include a number of blocks or files which cooperate together to perform the task required by the API commands. All API commands are received by control block 513. Those pertaining to memory transfer are directed to memory transfer block 515. Operations which require the reading of instructions are routed to read instructions file 517. Operations which require the writing of instructions are routed to write instructions file 519. Operations which require the reading of data are directed to read data file 521. Operations which require the writing of data are directed to write data file 523. All reading and writing functions are preformed through input/output read/write control block 535. API instructions which require that the processor be reset are directed to reset processor file 525. API instructions which require that the process begin running are routed to run processor file 527. As is shown in FIG. 26, a Category No. 5 type command which queries about the capabilities of the digital signal processor may be routed through dsp files 465 to the query abilities 429 to determine the configuration and capabilities of the digital signal processor. As is also shown in FIG. 26, dsp BIOS interface 465 may receive interrupts through interrupt handler file 533 which is established by the install interrupt handler file 531. The interrupt handler file 533 generates a callback which is routed to IPC handler 463, which is depicted in FIG. 22, and which is depicted in greater detail in block diagram form in FIG. 24.

Figure 24:
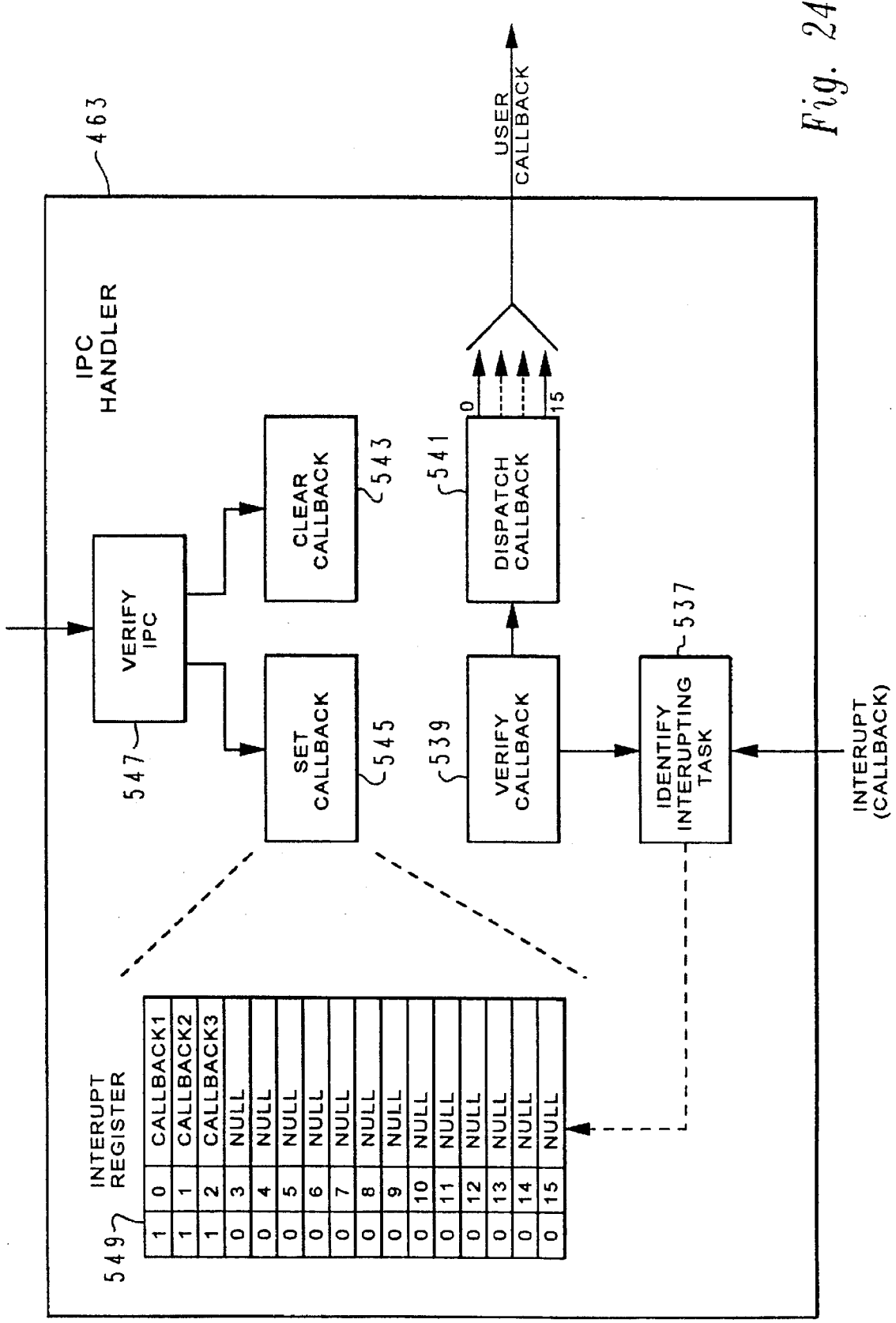
FIG. 24 is a detailed block diagram representation of the IPC handler of FIG. 22.

With reference now to FIG. 24, IPC handler 463 depicts the functional blocks and files which cooperate to perform the tasks of the IPC handler 463. Identifying interrupting tasks block 537 actually receives the interrupt, and accesses an interrupt register 549 to determine the particular user callback which is identified to the particular interrupt. As is shown in interrupt register 549, the interrupt register comprises a sixteen bit word, with each bit representing a particular required callback. One or more interrupts may be simultaneously active, requiring the generation of a user callback for each one. The dsp manager cycles through the sixteen bit word one bit at a time and addresses each interrupt, and corresponding user callback, individually. The verify callback file 539 communicates with both the identify interrupting task file 537 and the dispatch callback file 541. The dispatch callback file 541 actually generates the user callback signals. The verify IPC file 547 receives two types of API commands, including: dsp connect IPC, and dsp disconnect IPC. The dsp connect IPC command connects to the IPC handler 463, while the dsp disconnect IPC command disconnects the IPC handler 463. The verify IPC file 547 communicates with the set callback file 545 and the clear callback file 543. The set callback file 545 is used to establish a particular callback for a particular interrupt. The clear callback file 543 voids the previous arrangement of interrupts and callbacks and allows for reconfiguration of the interrupt and callback protocol.

Figure 23:
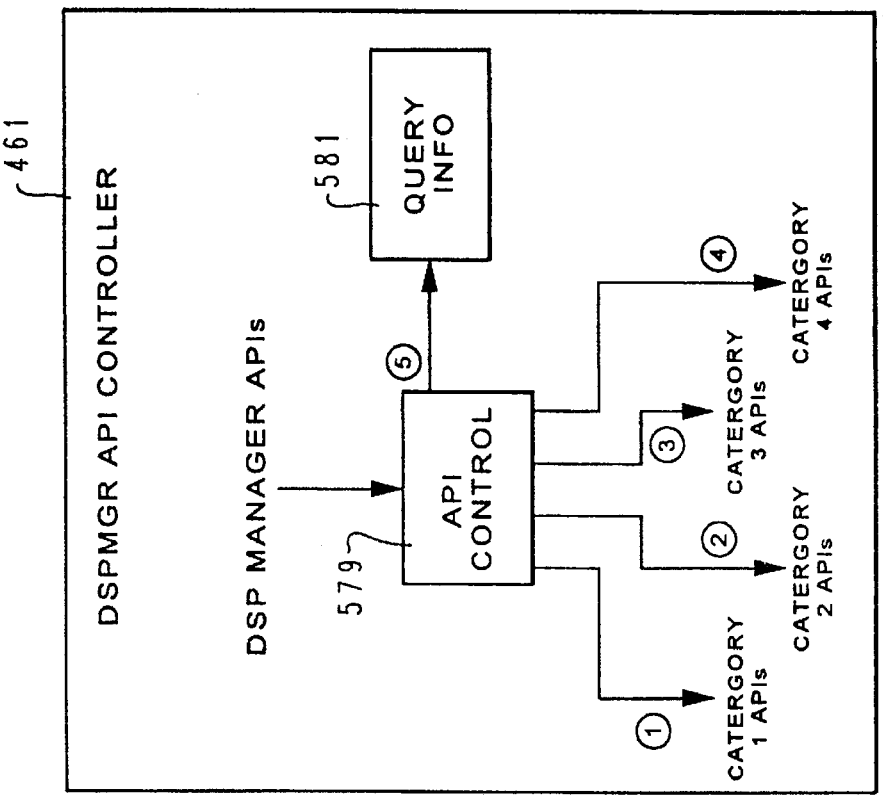
FIG. 23 is a detailed block diagram representation of the Digital Signal Processor Manager API control of FIG. 22.

FIG. 23 is a detailed block diagram representation of the digital signal processor manager API controller 461. As is shown, API control block 579 receives the application program interface commands from the application program, and routes them to the appropriate task blocks. Category No. 5 commands are directed by API control block 579 to query info block 581. With reference now to Table 4, the Category No. 5 commands include a number of commands which can be considered "housekeeping" commands. The dsp abilities command determines what resources are available at the time the command is made. The dsp label to address command is a call which is made by the driver to the dsp manager to allow the set up of a memory transfer. The dsp name to module handle command, the dsp name to task handle command, and the dsp name to segment handle command facilitate communication between drivers 63, 65, 67, and 69 of FIG. 2 and dsp manager 71 of FIG. 2 at the module, task, and segement level, and are conventional. The dsp query task, query dsp info command, the dsp query manager info command, the dsp query module info command, and the dsp miscellaneous info command are used to transfer information pertaining to the digital signal processor, the digital signal processor manager, and selected modules. These queries are predominantly useful in troubleshooting and housekeeping operations.

Figure 29:
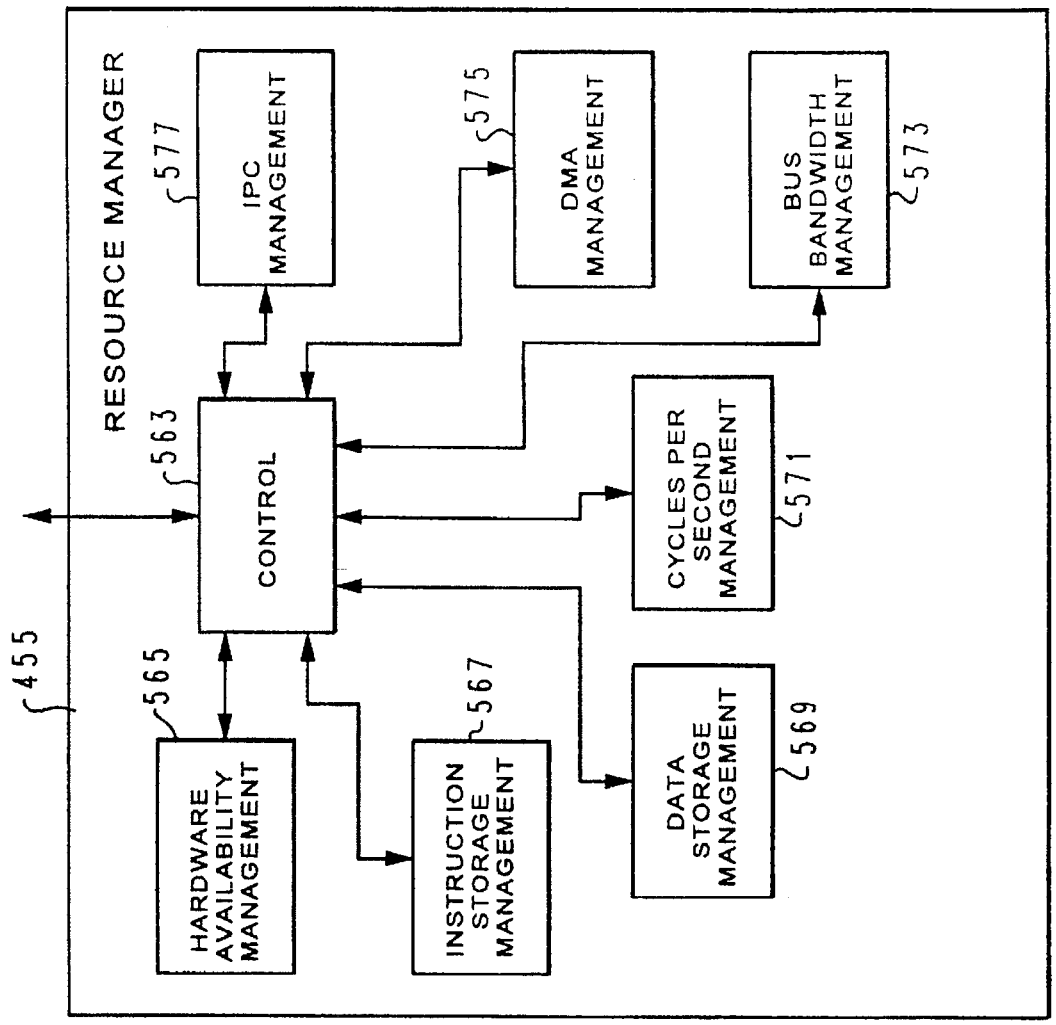
FIG. 29 is a detailed block diagram representation of the resource manager of FIG. 22.
Figure 27:
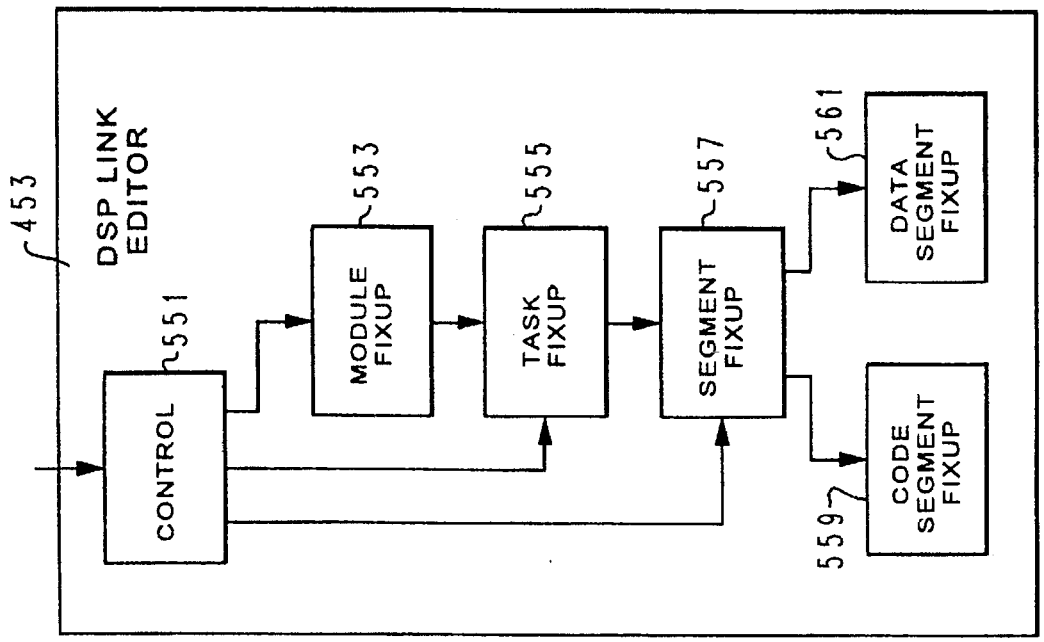
FIG. 27 is a detailed block diagram representation of the DSP Link Editor of FIG. 22.

The digital signal processor manager 71 of FIG. 22 allows for the dynamic, real-time, and continuous management of digital signal processor resources, and as a consequence allows for the dynamic and temporally overlapping loading and freeing of modular multimedia software tasks. In the prior art, it was not possible to load or free particular multimedia software tasks while other multimedia software tasks were being performed. As is shown in FIG. 29, dsp resource manager 455 includes a plurality of software files which independently manage digital signal processing resources. Hardware availability management file 565 manages the availability of multimedia end devices, and other peripheral devices. Instruction storage management file 567 independently manages the storage of instructions in instruction memory 41 of FIG. 2. Data storage management file 569 independently manages the storage of data in data memory 43 of FIG. 2. Instruction storage management file 567 and data storage management file 569 know at all times the amount of memory in instruction memory 41 and data memory 43 which has been claimed by the multimedia software tasks, and what amount of instruction memory and data memory is available for receipt of data and instructions when additional modular multimedia software tasks are loaded to the digital signal processor. Cycles per second management file 571 continually monitors the consumed and available cycles per second of the digital signal processor. It knows at all times the number of cycles per second which are being consumed by the task or tasks being executed by the digital signal processor, as well as the available cycles per second. No modular multimedia software task may be loaded to the digital signal processor for execution unless sufficient cycles per second are available. Direct memory access management file 575 manages the digital signal processor resources which are dedicated to direct memory access operations. In particular, direct memory access management file 575 determines the amount of DMA packets and packet size which have been dedicated to direct memory access operations. No other direct memory access task is allowed unless sufficient resources are available. The IPC management file 577 continually monitors the allocation of the available interrupts. Modular multimedia tasks which require interrupts which are not available will not be loaded to the digital signal processor. Finally, the bus bandwidth management file 573 determines the level of activity of the main data communication and instruction communication buses, and determines whether a particular task will require excessive use of the buses.

The important advantages provided by the digital signal processing management program are that (1) the system allows modular multimedia software tasks to be commenced and terminated without interruption of other modular multimedia tasks which are being executed by the digital signal processor (2) without requiring that the modular multimedia tasks be especially adapted for concurrent execution by the digital signal processor. This result is accomplished by using digital signal processor manager 71 to dynamically determine the capacity of digital signal processor for accepting and performing tasks which may be loaded to it.

Figure 25:
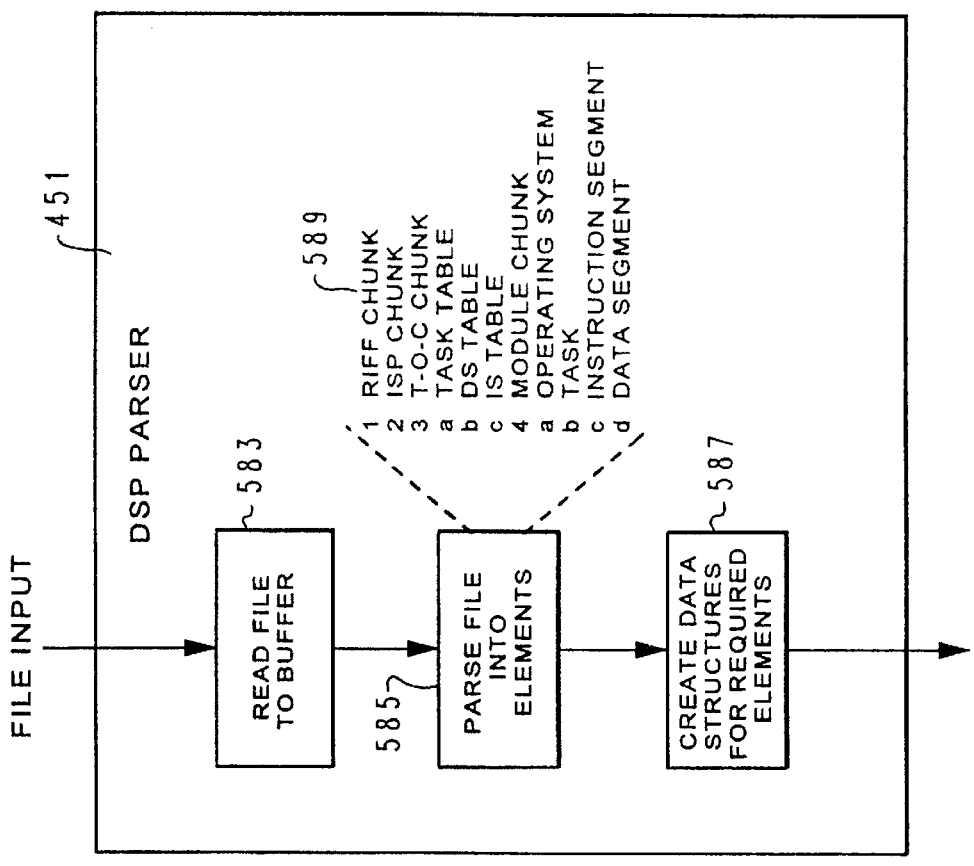
FIG. 25 is a detailed block diagram representation of the DSP parser of FIG. 22.

This process can best be understood with simultaneous reference to FIG. 22 and FIG. 31. The process begins at block 591. An API load command is provided by the multimedia application to the digital signal processor manager 71 requesting loading of a module which is composed of a plurality of modular multimedia software tasks, a single modular multimedia software task, or a single thread of execution to the digital signal processor for execution by the digital signal processor. In block 595, the task or module which is requested to be loaded to the digital signal processor is received at the dsp parser 451 and parsed, as shown in FIG. 25. In accordance with FIG. 25, the file is read into read file buffer 583, and parsed by block 585 into a variety of conventional "chunks" and/or "tables". In block 587, dsp parser 451 creates data structures which are required for the parsed elements.

Returning now to FIG. 31, in block 597, the parsed task or module which is requested to be loaded to the digital signal processor is examined by task loader 457 to determine its "requirements". Requirements are defined to be the amount of instruction memory and data memory required by the task or module, the amount of cycles per second which will be consumed by the task or module upon execution, the number of connections (through data communication modules) which write to or read from the task or module, and the number (if any) of interrupts required during the execution of the task or module.

Next, in block 599, dsp resource manager 455 is consulted to determine if loading of the task or module is possible. As is graphically depicted in FIG. 29, resource manager 455 includes separate files which independently monitor hardware availability, instruction memory availability, data memory availability, cycles-per-second availability, bus bandwidth availability, interrupt vector availability, and direct memory access resource availability. The hardware availability management file 565 continuously monitors the availability of the multimedia end devices and provides an indication of whether these multimedia end devices are being used by other modular multimedia software tasks which are being executed by the digital signal processor. The instruction storage management file 567 continuously monitors the amount of instruction memory which is being used by the modular multimedia software tasks which are being executed by the digital signal processor, and also continuously determines the total amount of instruction memory which is available for modular multimedia software tasks which may be called for loading to the digital signal processor. The data storage management file 569 continuously monitors the data memory to determine the total amount of data memory which is being currently used by the modular multimedia software tasks which are being executed by the digital signal processor. The data storage management file 569 also continuously monitors the total amount of data memory which is available for files which may be called for loading to the digital signal processor for execution. The cycles per second management file 571 continually monitors the cycles per second of the digital signal processor which are being consumed by the modular multimedia tasks which are being executed by the digital signal processor. The cycles per second management file 571 continuously provides an indication of the total available cycles per second which may be used for other modular multimedia software tasks which may be loaded to the digital signal processor for execution. The bus bandwidth management file 573 continually monitors the availability of data buses in the digital signal processor, and provides a current indication of the bus capacity of the digital signal processor, to allow a determination of whether additional modular multimedia tasks may be loaded to the digital signal processor for execution. The IPC management file 577 continually monitors the allocation and availability of interrupt vectors. As is graphically depicted in FIG. 24, the preferred digital signal processor includes a dedicated interrupt register which allows for sixteen different interrupt vectors to be employed by the various modular multimedia tasks which are being executed by the digital signal processor. If sixteen modular multimedia software tasks are concurrently being executed by the digital signal processor, each of which requires an interrupt vector, no additional modular multimedia software tasks may be loaded to the digital signal processor that require the use of an interrupt vector. Of course, additional modular multimedia software tasks may be loaded to the digital signal processor for execution, provided that they do not require the use of an interrupt vector.

Returning now to FIGS. 31 and 22, resource manager 455 is consulted to determine if loading of the task or module is possible, in view of the current resource allocation and availability in terms of hardware availability, instruction memory availability, data memory availability, cycles per second availability, bus bandwidth availability, direct memory access availability, and interrupt vector availability. If a particular modular multimedia software task is called by the multimedia application software for loading to the digital signal processor, it must not exceed the available resources or the digital signal processor. For example, if the multimedia end devices which are operated by a particular modular multimedia software task are available, and sufficient instruction and data memory space is available, but insufficient digital signal processing cycles per second are not available, the task will not be loaded to the digital signal processor. For an alternative example, if a particular modular multimedia software task is requested to be loaded to the digital signal processor, but all sixteen interrupt vectors are currently being used by other modular multimedia software tasks which are being executed by the digital signal processor, the loading operation is not allowed. If loading is determined to be allowed, the task or module is sent to dsp link editor 453 for "fix-up" operation which at module fixup block 553, task fixup block 555 and segment fixup block 557 to allow writing to the data and instruction memory by blocks 559, 561.

In this manner, a single digital signal processor may be loaded with a variety of modular multimedia software tasks, with regard only to the availability of digital signal processor resources. As a consequence of this feature, the modular multimedia software task need not be configured, modified, or otherwise arranged to account for the presence or execution of other modular multimedia software tasks. This provides an open architecture which allows end users to write completely independent multimedia applications which can be simultaneously loaded and executed by a single digital signal processor. This open architecture and modularity in design also allows for multiple digital signal processors to be "networked" together to share the execution of a plurality of modular multimedia tasks. As is shown in FIG. 32, N digital signal processors may be in communication with a single digital signal process management program 71. As is shown, digital signal processor 611, digital signal processor 613, digital signal processor 615, and digital signal processor 617 may operate in parallel to execute a plurality of modular multimedia software tasks.

When multiple digital signal processors are employed with a single digital signal processor manager 71, the manager will attempt to load tasks to a particular one of the digital signal processors. If a digital signal processor is not available for loading of the particular module or task, the digital signal processor manager 71 will attempt to load to the next digital signal processor. If this digital signal processor is not available, the digital signal processor will attempt to load to still another digital signal processor. This process repeats until an available digital signal processor is located which has sufficient resources to accept the task or module which is required for loading by the digital signal process manager 71. This also provides a modularity in design which allows for numerous digital signal processors to be added to an existing system to increase its capacity for handling multimedia applications.

While the invention has been particularly shown and described with reference to a preferred embodiment, it will be understood by those skilled in the art that various changes in form and detail may be made therein without departing from the spirit and scope of the invention.

TABLE 1 label GPC {OWNER=(ownername) I USER=(username)},
[{size=n I MINSIZE=n},]
[PROTOCOL=protocol,]
MAXWPF=n
MPTRSEP=n,
[SAMPRATE=n,]
[ADDRMODE=address mode,]
[MODE=mode,]
[{MAXDELT=n I MAXDELF=n},]
[STRIDE=n I i,j]

TABLE 2

| owner protocol | User Protocol | | | |
|---|---|---|---|---|
|  | SYNC | OWNERDD | USERDD | SAFEDD |
| SYNC | • | • | | |
| OWNERDD | | • | | |
| USERDD | • | • | • | • |
| SAFEDD | | • | | • |

TABLE 3

Next Virtual DCM
Mute
Control Block[11]
User pointer
Size
Max words per frame
Pointer to owner's pointer
Owner Size
User-defined Data (variable)
. . .

TABLE 4

CATERGORY NO. 1

1) dsp Allocate Seg
2) dsp Initiation
3) dsp Load Module
4) dsp Load Task
5) dsp Load Segment

CATERGORY NO. 2

1) dsp Change CPF
2) dsp Change DMA
3) dsp Change Module State
4) dsp Change Task State
5) dsp connect DCM
6) dsp Connect ITCB
7) dsp Disconnect DCM
8) dsp disconnect ITCB
9) dsp Free Module
10) dsp Free Segment
11) dsp Free Task

CATERGORY NO. 3

1) dsp Memtransfer
2) dsp Reset
3) dsp Run

CATERGORY NO. 4

1) dsp Connect IPC
2) dsp Disconnect IPC

CATERGORY NO. 5

1) dsp Abilities
2) dsp Label to Address
3) dsp Name to Module Handle
4) dsp Name to Segment Handle
5) dsp Name to Task Handle
6) dsp Query DSP Info
7) dsp Query Manager Info
8) dsp Query Misc Info
9) dsp Query Module Info

We claim:

1. A data processing system for executing multimedia applications which interface with multimedia end devices that consume or produce at least one of (a) real-time and (b) asynchronous streamed data, comprising;

a central processing unit for data processing operations including execution of said multimedia application;

a digital signal processor for processing data including said streamed data;

a plurality of modular multimedia software tasks which are executable by said digital signal processor and which may be called by said multimedia application for execution in said digital signal processor;

a plurality of data communication modules for:

(a) dynamically linking selected ones of said plurality of modular multimedia software tasks with selected others of said plurality of modular multimedia software tasks, and (b) dynamically linking selected multimedia end devices with selected ones of said plurality of modular multimedia software tasks;

each of said plurality of data communication modules allowing continuous, real-time, and unidirectional communication of said streamed data under selected ones of a plurality of standardized streamed data communication protocols;

wherein said standardized streamed data communication protocols include an owner data driven protocol, wherein said particular one of said plurality of modular multimedia software tasks or particular multimedia end device writes data to said selected one of said plurality of communication modules at a particular production rate, and said particular one of said plurality of modular multimedia software tasks or particular multimedia end device reads data from said selected one of said plurality of communication modules at a consumption rate which is adequate to consume all data written to said selected one of said plurality of data communication modules;

thus defining an open architecture for real-time processing which allows additional modular multimedia software tasks to be added to said plurality of modular multimedia software tasks and selectively linked to at least on of (a) selected ones of said plurality of modular multimedia software tasks, and (b) selected ones of said multimedia end devices.

2. A data processing system according to claim 1, wherein said plurality of modular multimedia software tasks include at least one modular multimedia software task which performs the functions of a selected multimedia end device by consuming or producing at least one of (a) real-time and (b) asynchronous streamed data.

3. A data processing system according to claim 1, wherein each of said plurality of data communication modules defines a circular memory buffer.

4. A data processing system according to claim 1, wherein said standardized streamed data communication protocols defines:

a particular one of said plurality of modular multimedia software tasks or a particular multimedia end device as being capable of writing data to a selected one of said plurality of data communication modules;

a particular one of said plurality of modular multimedia software tasks or a particular multimedia end device as being capable of reading data from said selected one of said plurality of data communication modules.

5. A data processing system according to claim 4, wherein said standardized streamed data communication protocols include:

a synchronous protocol, wherein data is written to, and read from, said selected one of said plurality of data communication modules at a constant rate.

6. A data processing system according to claim 4, wherein said standardized streamed data communication protocols include:

a user data drive protocol, wherein said particular one of said plurality of modular multimedia software tasks or particular multimedia end device reads data from said selected one of said plurality of communication modules at a particular consumption rate, and said particular one of said plurality of modular multimedia software tasks or particular multimedia end devices writes data to said selected one of said plurality of data communication modules at a production rate which is adequate to ensure that new data is always available for reading.

7. A data processing system according to claim 4, wherein said standardized streamed data communication protocols include:
  a safe data protocol wherein:
    (a) data is never written to said selected one of said plurality of communication modules if it is in a full condition; and
    (b) data is never read from said selected one of said plurality of communication modules if it is in an empty condition.

8. A data processing system according to claim 4, wherein selected ones of said plurality of data communication modules directly receive at least one of (a) real-time and (b) asynchronous streamed data which is produced by selected ones of said multimedia end devices.

9. A data processing system according to claim 4, wherein said standardized streamed data communication protocols may be used to introduce or eliminate phase delay in streamed data.

10. A data processing system according to claim 1, further comprising:
  a control block which selectively passes status and control parameters between selected ones of said plurality of modular multimedia software tasks or multimedia end devices between which streamed data is passed through selected ones of said plurality of data communication modules.

11. A data processing system for executing multimedia applications which interface with multimedia end devices that consume or produce at least on of (a) real-time and (b) asynchronous streamed data, comprising:
  a central processing unit for data processing operations including execution of said multimedia application;
  a digital signal processor for processing data including said streamed data;
  a plurality of modular multimedia software tasks which are executable by said digital signal processor and which may be called by said multimedia application for execution in said digital signal processor;
  a plurality of data communication modules for:
    (a) dynamically linking selected ones of said plurality of modular multimedia software tasks with selected others of said plurality of modular multimedia software tasks, and
    (b) dynamically linking selected multimedia end devices with selected ones of said plurality of modular multimedia software tasks;
  each of said plurality of data communication modules, allowing continuous, real-time, and unidirectional communication of said streamed data under selected ones of a plurality of standardized streamed data communication protocols;
  wherein said standardized streamed data communication protocols include
  an owner data driven protocol, wherein said particular one of said plurality of modular multimedia software tasks or particular multimedia end device writes data to said selected one of said plurality of communication modules at a particular production rate, and said particular one of said plurality of modular multimedia software tasks or particular multimedia end device reads data from said selected one of said plurality of communication modules at a consumption rate which is adequate to consume all data written to said selected one of said plurality of data communication modules;
  thus allowing modular multimedia software tasks to be constructed which represent virtual machines of selected multimedia end devices for performing functions of said selected multimedia end devices, in lieu of said selected multimedia end devices, by consuming or producing at least one of (a) real-time and (b) asynchronous streamed data.

12. In a multimedia data processing system including:
  (a) a central processing unit for data processing operations;
  (b) a digital signal processor for processing real-time and asynchronous streamed data;
  (c) multimedia end devices that consume or produce at least on of (a) real-time and (b) asynchronous streamed data; and
  (d) multimedia applications which are executable by said central processing unit;
  an improved means for communicating streamed data, comprising:
    a plurality of modular multimedia software tasks which are executable by said digital signal processor and which may be called by said multimedia application for execution in said digital signal processor;
    a plurality of data communication modules for:
      (a) dynamically linking selected ones of said plurality of modular multimedia software tasks with selected others of said plurality of modular multimedia software tasks, and
      (b) dynamically linking selected multimedia end devices with selected ones of said plurality of modular multimedia software tasks;
    each of said plurality of data communication modules, allowing continuous, real-time, and unidirectional communication of said streamed data under selected ones of a plurality of standardized streamed data communication protocols;
    wherein said standardized streamed data communication protocols include
    an owner data driven protocol, wherein said particular one of said plurality of modular multimedia software tasks or particular multimedia end device writes data to said selected one of said plurality of communication modules at a particular production rate, and said particular one of said plurality of modular multimedia software tasks or particular multimedia end device reads data from said selected one of said plurality of communication modules at a consumption rate which is adequate to consume all data written to said selected one of said plurality of data communication modules;
    thus defining an open architecture for real-time processing which allows additional modular multimedia software tasks to be added to said plurality of modular multimedia software tasks and selectively linked to at least one of (a) selected ones of said plurality of modular multimedia software tasks, and (b) selected ones of said multimedia end devices.

13. An improved means for communicating streamed data according to claim 12, wherein said plurality of modular multimedia software tasks include at least one modular multimedia software task which performs the functions of a selected multimedia end device by consuming or producing at least one of (a) real-time and (b) asynchronous streamed data.

14. An improved means for communicating streamed data according to claim 12, wherein each of said plurality of data communication modules defines a circular memory buffer.

15. An improved means for communicating streamed data according to claim 12, wherein said standardized streamed data communication protocols defines:

a particular one of said plurality of modular multimedia software tasks or a particular multimedia end device as being capable of writing data to a selected one of said plurality of data communication modules;

a particular one of said plurality of modular multimedia software tasks or a particular multimedia end device as being capable of reading data from said selected one of said plurality of data communication modules.

16. An improved means for communicating streamed data according to claim 15, wherein said standardized streamed data communication protocols include:

a synchronous protocol, wherein data is written to, and read from, said selected one of said plurality of data communication modules at a constant rate.

17. An improved means for communicating streamed data according to claim 15, wherein said standardized streamed data communication protocols include:

a user data drive protocol, wherein said particular one of said plurality of modular multimedia software tasks or particular multimedia end device reads data from said selected one of said plurality of communication modules at a particular consumption rate, and said particular one of said plurality of modular multimedia software tasks or particular multimedia end devices writes data to said selected one of said plurality of data communication modules at a production rate which is adequate to ensure that new data is always available for reading.

18. An improved means for communicating streamed data according to claim 15, wherein said standardized streamed data communication protocols include:

a safe data protocol wherein:
 (a) data is never written to said selected one of said plurality of communication modules if it is in a full condition; and
 (b) data is never read from said selected one of said plurality of communication modules if it is in an empty condition.

19. An improved means for communicating streamed data according to claim 15, wherein selected ones of said plurality of data communication modules directly receive at least one of (a) real-time and (b) asynchronous streamed data which is produced by selected ones of said multimedia end devices.

20. An improved means for communicating streamed data according to claim 15, wherein said standardized streamed data communication protocols may be used to introduce or eliminate phase delay in streamed data.

21. An improved means for communicating streamed data according to claim 12, further comprising:

a control block which selectively passes status and control parameters between selected ones of said plurality of modular multimedia software tasks or multimedia end devices between which streamed data is passed through selected ones of said plurality of data communication modules.

22. In a multimedia data processing system including:
 (a) a central processing unit for data processing operations;
 (b) a digital signal processor for processing real-time and asynchronous streamed data;
 (c) multimedia end devices that consume or produce at least one of (a) real-time and (b) asynchronous streamed data; and
 (d) multimedia applications which are executable by said central processing unit;

a method of communicating streamed data which is at least one of (a) real-time and (b) asynchronous, comprising the method steps of:

creating a plurality of modular multimedia software tasks which may be selectively loaded to said digital signal processor for execution;

creating a plurality of data communication modules, each of which includes a plurality of memory locations for receipt of said streamed data;

dynamically connecting selected ones of said plurality of data communication modules between selected ones of said plurality of modular multimedia software tasks;

for each data communication module, enabling one of said plurality of said plurality of modular multimedia software tasks or multimedia end devices to write data thereto and enabling at least one of said plurality of modular multimedia software tasks or multimedia end devices to read therefrom;

selecting at least one data communication protocol for at least one of (a) writing operation and (b) reading operations for each data communication module from a plurality of standardized predetermined data communication protocols;

wherein said standardized streamed data communication protocols include an owner data driven protocol, wherein said particular one of said plurality of modular multimedia software tasks or particular multimedia end device writes data to said selected one of said plurality of communication modules at a particular production rate, and said particular one of said plurality of modular multimedia software tasks or particular multimedia end device reads data from said selected one of said plurality of communication modules at a consumption rate which is adequate to consume all data written to said selected one of said plurality of data communication modules.

23. A method of communicating streamed data according to claim 22, further comprising:

establishing a data communication protocol for at least one of (a) writing operations and (b) reading operations for each data communication module.

24. A method of communicating streamed data according to claim 22, wherein said standardized predetermined data communication protocols include at least one of:

(a) a synchronous data communication protocol with said reading operations and said writing operations being conducted at identical rates;
 (b) a writing operation moderated data communication protocol with said reading operations being performed at a rate sufficient to consume all of said streamed data which is written to a particular one of said plurality of data communication modules;
 (c) a reading operation moderated data communication protocol with said writing operations being performed at a rate sufficient to produce a sufficient amount of said streamed data to always supply data to a particular one of said plurality of data communication modules; and
 (d) a coordinated data communication protocol with said reading operations and said writing operations coordinated to ensure that said streamed data is always available from a particular one of said plurality of data communication modules for reading by a particular one of said plurality of modular multimedia software tasks and for writing from a particular one of said plurality of modular multimedia software tasks.

25. A method of communicating streamed data according to claim 22, further comprising:

restricting each of said plurality of data communication modules to allow only unidirectional communication of said streamed data between selected pairs of said plurality of modular multimedia software tasks.

26. A method of communicating streamed data according to claim 22, further comprising:

mixing streamed data from several of said plurality of modular multimedia software tasks to a single one of said plurality of modular multimedia software tasks.

27. A method of communicating streamed data according to claim 22, further comprising:

passing a plurality of data streams between selected pairs of said plurality of modular multimedia software tasks through selected ones of said data communication modules.

28. A method of communicating streamed data according to claim 22, further comprising:

dedicating one of said plurality of data communication modules for receipt of said streamed data from a multimedia end device.

29. A method of communicating streamed data according to claim 22, further comprising:

dedicating one of said plurality of data communication modules for transmission of said streamed data to a multimedia end device for consumption by that multimedia end device.

30. A method of communicating streamed data according to claim 22, further comprising:

creating a plurality of intertask control blocks for passing status and control variables between selected ones of said plurality of modular multimedia software tasks.

31. A method of communicating streamed data according to claim 22, further comprising:

passing digitized analog audio output data streams from a plurality of modular multimedia software tasks to a single multimedia end device for simultaneous consumption.

32. A method of communicating streamed data according to claim 22, further comprising:

emulating, with a selected one of said plurality of modular multimedia software tasks, operating functions of a selected multimedia end device, in lieu of said selected multimedia end device.

33. A method of communicating streamed data according to claim 22, further comprising:

synchronizing a plurality of data streams by performing at least one phase modification operation with at least one of said plurality of modular multimedia software tasks upon at least one of said plurality of data streams.

34. A method of communicating streamed data according to claim 22, further comprising:

passing said streamed data from at least one of said plurality of modular multimedia software tasks which is being executed by said digital signal processor to another of said plurality of modular multimedia software tasks which is being executed by another digital signal processor.

* * * * *